(12) United States Patent
Abe et al.

(10) Patent No.: US 9,393,725 B2
(45) Date of Patent: Jul. 19, 2016

(54) SYNTHETIC RESIN BOTTLE HAVING A GRADATION PATTERN, AND PROCESS FOR INJECTION MOLDING THE PREFORM FOR USE IN SUCH A BOTTLE

(71) Applicants: Minoru Abe, Tokyo (JP); Tetsuo Takahashi, Tokyo (JP); Masato Suzuki, Kanagawa (JP); Hiromi Shimura, Kanagawa (JP); Junichi Chiba, Kanagawa (JP)

(72) Inventors: Minoru Abe, Tokyo (JP); Tetsuo Takahashi, Tokyo (JP); Masato Suzuki, Kanagawa (JP); Hiromi Shimura, Kanagawa (JP); Junichi Chiba, Kanagawa (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 186 days.

(21) Appl. No.: 14/084,327

(22) Filed: Nov. 19, 2013

(65) Prior Publication Data

US 2014/0076837 A1    Mar. 20, 2014

Related U.S. Application Data

(62) Division of application No. 13/485,443, filed on May 31, 2012, which is a division of application No. 12/977,285, filed on Dec. 23, 2010, now Pat. No. 8,211,520, which is a division of application No. 11/844,311, filed as application No. PCT/JP2006/308515 on Apr. 24, 2006, now Pat. No. 8,580,365.

(30) Foreign Application Priority Data

Apr. 28, 2005  (JP) .................................. 2005-132961
May 31, 2005  (JP) .................................. 2005-160282
May 31, 2005  (JP) .................................. 2005-160477
May 31, 2005  (JP) .................................. 2005-160478

(51) Int. Cl.
| | | |
|---|---|---|
| *B29C 45/16* | (2006.01) | |
| *B29B 11/14* | (2006.01) | |
| *B29C 49/22* | (2006.01) | |
| *B65D 1/02* | (2006.01) | |
| *B65D 23/02* | (2006.01) | |
| *B29B 11/08* | (2006.01) | |
| *B29C 49/06* | (2006.01) | |
| *B29K 23/00* | (2006.01) | |
| *B29K 67/00* | (2006.01) | |
| *B29K 77/00* | (2006.01) | |
| *B29K 105/00* | (2006.01) | |
| *B29L 31/00* | (2006.01) | |

(52) U.S. Cl.
CPC ............ *B29C 45/1642* (2013.01); *B29B 11/14* (2013.01); *B29C 45/1646* (2013.01); *B29C49/221* (2013.01); *B65D 1/0215* (2013.01); *B65D 23/02* (2013.01); *B29B 11/08* (2013.01); *B29B 2911/141* (2013.01); *B29B 2911/1402* (2013.01); *B29B 2911/1404* (2013.01); *B29B 2911/1408* (2013.01); *B29B 2911/1412* (2013.01); *B29B 2911/14026* (2013.01); *B29B 2911/1433* (2015.05); *B29B 2911/1444* (2013.01); *B29B 2911/14053* (2013.01); *B29B 2911/14066* (2013.01); *B29B 2911/14086* (2013.01); *B29B 2911/14093* (2013.01); *B29B 2911/14146* (2013.01); *B29B 2911/14326* (2013.01); *B29B 2911/14331* (2015.05); *B29B 2911/14333* (2013.01); *B29B 2911/14336* (2015.05); *B29B 2911/14337* (2015.05); *B29B 2911/14466* (2013.01); *B29B 2911/14633* (2013.01); *B29B 2911/14646* (2013.01); *B29B 2911/14713* (2013.01); *B29B 2911/14753* (2013.01); *B29B 2911/14766* (2013.01); *B29C 49/06* (2013.01); *B29C 2045/1698* (2013.01); *B29K 2023/12* (2013.01); *B29K 2067/00* (2013.01); *B29K 2077/00* (2013.01); *B29K 2105/0032* (2013.01); *B29K 2105/253* (2013.01); *B29K 2105/258* (2013.01); *B29K 2995/0026* (2013.01); *B29K 2995/0067*

(2013.01); *B29L 2031/7158* (2013.01); *Y10T 428/139* (2015.01); *Y10T 428/1352* (2015.01)

(58) Field of Classification Search
CPC .................. Y10T 428/1352; Y10T 428/139; B29B 2911/14633; B29B 2911/14646; B29B 2911/14713; B29B 2911/14753; B29B 2911/14766; B29B 11/08; B29B 11/14; B29B 2911/1402; B29B 2911/14026; B29B 2911/1404; B29B 2911/14053; B29B 2911/14066; B29B 2911/1408; B29B 2911/2911; B29B 2911/14086; B29B 2911/14092; B29B 2911/141; B29B 2911/1412; B29B 2911/14146; B29B 2911/14326; B29B 2911/14333; B29B 2911/1444; B29B 2911/14466; B29B 2911/1433; B29B 2911/14336; B29B 2911/14331; B29B 2991/14337; B29C 45/1642; B29C 45/1646; B29C 49/06; B29C 49/221; B29C 2045/1698; B29K 2023/12; B29K 2067/00; B29K 2077/00; B29K 2105/0032; B29K 2105/258; B29K 2995/0026; B29K 2995/0067; B29K 2105/253; B29L 2031/7158; B65D 1/0215; B65D 23/02

See application file for complete search history.

(56) References Cited

U.S. PATENT DOCUMENTS

| | | | |
|---|---|---|---|
| 4,535,901 | A | 8/1985 | Okudaira et al. |
| 5,595,799 | A | 1/1997 | Beck et al. |
| 6,322,344 | B1 | 11/2001 | Maruyama et al. |
| 6,344,249 | B1 | 2/2002 | Maruyama et al. |
| 6,544,459 | B2 | 4/2003 | Maruyama et al. |
| 2002/0036366 | A1 | 3/2002 | Maruyama et al. |
| 2008/0317989 | A1 | 12/2008 | Abe et al. |
| 2011/0115122 | A1 | 5/2011 | Abe et al. |

FOREIGN PATENT DOCUMENTS

| | | |
|---|---|---|
| JP | A-61-059984 | 3/1986 |
| JP | A-02-027124 | 1/1990 |
| JP | A-02-098409 | 4/1990 |
| JP | A-04-014607 | 1/1992 |
| JP | A-05-309648 | 11/1993 |
| JP | A-11-165330 | 6/1999 |
| JP | A-2000-254963 | 9/2000 |

OTHER PUBLICATIONS

Human Translation of JP-A-61-059984, published Mar. 27, 1986.
International Search Report dated Aug. 8, 2006 in International App. No. PCT/JP2006/305515.
Office Action dated Jun. 14, 2012 from U.S. Appl. No. 11/884,311.
Office Action dated Oct. 12, 2012 from U.S. Appl. No. 11/884,311.
Office Action dated Nov. 7, 2012 from U.S. Appl. No. 13/485,362.
Office Action dated Apr. 9, 2013 from U.S. Appl. No. 13/485,362.

*Primary Examiner* — Michael C Miggins
(74) *Attorney, Agent, or Firm* — Oliff PLC

(57) ABSTRACT

The technical problem to be solved is to change the thickness of the colored resin layer of the preform gradually in the upward or downward direction, by utilizing a tendency of gradual decrease in the thickness of the colored resin layer caused by the flow of the main resin inside the preform mold when the main resin and the colored resin are injected into the mold. This involves adjusting the injection pattern including the time of starting and ending the supply of the main resin and the colored resin, and pressure or velocity profiles, reducing the thickness of the colored resin layer gradually upstream or downstream, injection-molding the preform in which a color-gradated portion associated with the thickness of the colored resin layer has been formed, and biaxially drawing and blow molding this preform into a bottle having a color-gradated portion.

6 Claims, 26 Drawing Sheets

Fig.10
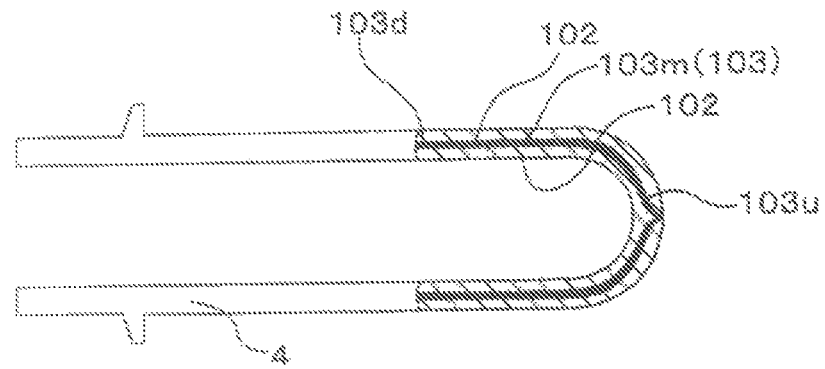
(a) Flow state of point F
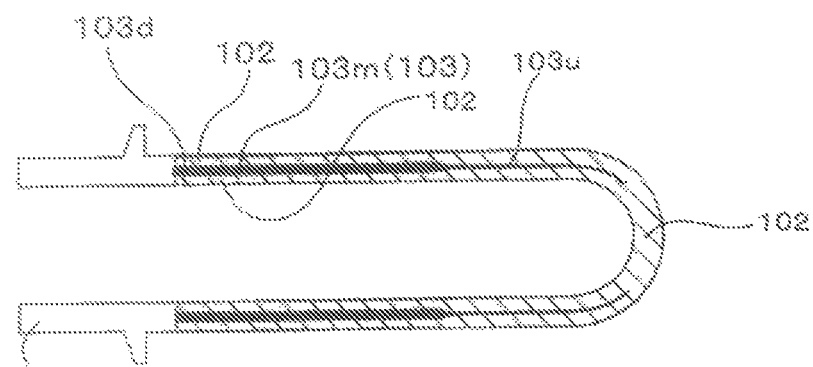
(b) Flow state of point M
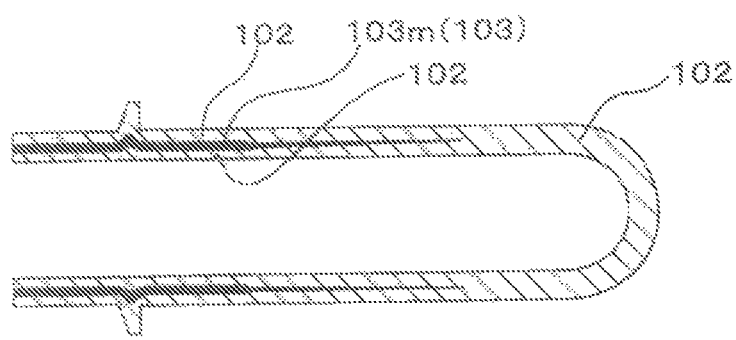
(c) Flow state of point D Fig.16
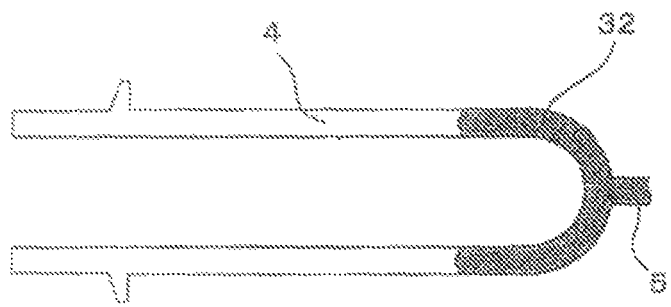
(a) Flow state at the time point of t2
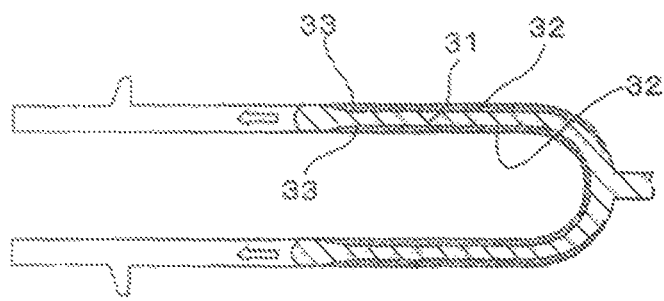
(b) Flow state at the time point of t4
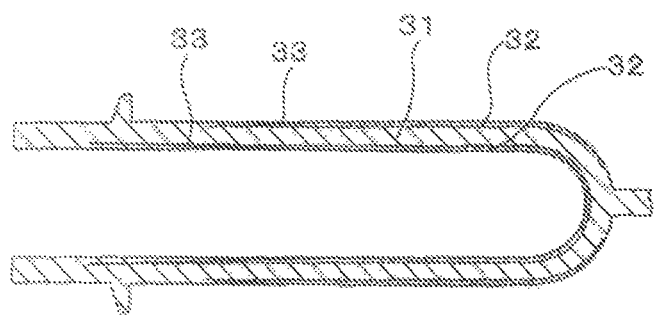
(c) Flow state at the time point of t5

Fig.24
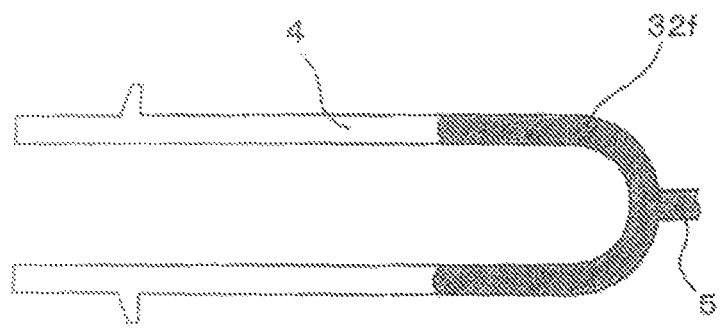
(a) Flow state at the time point of t2
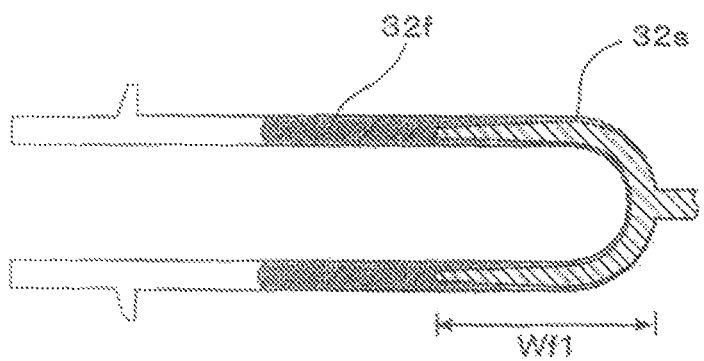
(b) Flow state at the time point of t3
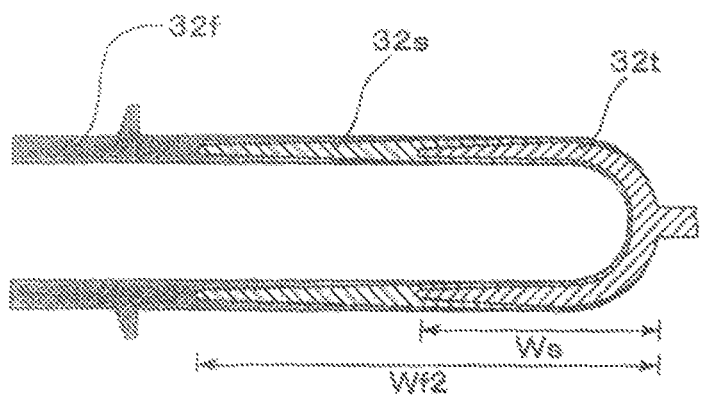
(c) Flow state at the point of t4

SYNTHETIC RESIN BOTTLE HAVING A GRADATION PATTERN, AND PROCESS FOR INJECTION MOLDING THE PREFORM FOR USE IN SUCH A BOTTLE

This is a Division of U.S. application Ser. No. 13/485,443 filed May 31, 2012, which is a Division of U.S. application Ser. No. 12/977,285 filed Dec. 23, 2010, which is a Division of U.S. application Ser. No. 11/884,311 filed Aug. 14, 2007, which in turn is a National Phase of Application No. PCT/JP2006/308515 filed Apr. 24, 2006, which claims the benefit of Applications JP 2005-132961 filed Apr. 28, 2005; JP 2005-160282 filed May 31, 2005; JP 160477 filed May 31, 2005; and JP 2005-160478 filed May 31, 2005. Each of the disclosures of the prior applications is hereby incorporated by reference herein in its entirety.

TECHNICAL FIELD

This invention relates to a synthetic resin bottle decorated with a gradation pattern, and to a process for injection molding the preform to be biaxially drawn and blow molded into this bottle.

BACKGROUND ART

Bottles made of the polyethylene terephthalate (PET) resin are utilized in various fields, including drinks, foods, and cosmetics. Methods of decorating the bottles are also wide-ranging with an intention to differentiate the merchandise. In many cases, bottles are decorated with printed shrink film. Patent document 1 describes a bottle obtained by blow-molding a preform having a laminar structure in which a colored intermediate layer has been formed intermittently.
[Patent document 1] JP2-98409 A

DISCLOSURE OF THE INVENTION

Technical Problems to be Solved by the Invention

Inventors of this invention worked on the development of a technology for bottle decorations by changing color density in the upward or downward directions in a biaxially drawn, blow-molded transparent bottle made of a PET resin to create color gradations caused by a change in color density. It was found from their tests that the process described in the patent document was unsatisfactory from a point of view of decorativeness because gradations in color were limitative, though possible, when a preform was provided with the intermediate layer of a colored resin and was biaxially drawn and blow molded into the bottle.

More specifically, the colored resin layer in the above-described conventional technology has a structure in which its thickness is increased or decreased in a continued manner. The color gradation created as a color pattern is the gradation inside the color-decorated area formed by this colored resin layer. Therefore, it is difficult to put an emphasis on the gradation. Especially in light colors, a problem arises from the difficulty in creating a gradation pattern.

As another problem, the flow of a molding resin material is widely changed when the material is injected into the mold by the injecting machine. Therefore, any increase or decrease in the thickness of the layer of an injected colored resin that has been formed inside the injecting machine is not always reflected on the change in the thickness of the layer of the colored resin formed inside the mold. For this reason, it is difficult to obtain a decoration based on the color gradation.

Even if such a decoration is obtained, the form of color decoration is not constant, and it is quite difficult to commercialize a bottle having such a decoration.

Still another problem is that the control of the injecting machine operation is troublesome and difficult. The injecting behavior of a main resin is affected by the changes in the injection rate for the colored resin. Thus, it is necessary to precisely align the injecting behavior of the main resin with that of the colored resin. Such alignment is difficult.

The technical problem to be solved by the invention is to utilize a tendency of gradual decrease in the thickness of the layer of the colored resin caused by the flow of the main resin inside the preform mold when the main resin and the colored resin are injected into the mold and to change the thickness of the intermediate layer or the colored resin layer of the preform gradually in the upward or downward direction. The objects of this invention is to provide a biaxially drawn, blow molded bottle having new decorativeness created by sophisticated color gradations caused by the changes in color density.

It is also a technical problem of this invention to form a preform having multiple colored layers of a laminar structure, in which each layer is made of a colored resin of a different color shade and to change the thickness of these colored layers gradually in the upward or downward direction. Thus, another object of this invention is to provide a biaxially drawn, blow molded synthetic resin bottle having unconventional decorativeness created by sophisticated color gradations caused by the change in color density, color shade, or both.

Means of Solving the Problems

The disclosure relates to the bottle decorated with gradation patterns. The means of carrying out one aspect of the invention is a synthetic resin bottle obtained by biaxially drawing and blow molding a preform having the shape of a bottomed cylinder. The bottle has a gradation pattern in color, wherein a portion of cylindrical body of the bottle has a laminar structure in which a main resin layer made of a main resin is laminated with a colored resin layer made of a colored resin of another color, wherein a color-decorated portion is created by this colored resin layer, and wherein a color-gradated portion is created by a thin boundary area which is an end portion of the colored resin layer and where the colored resin layer has gradually reduced its thickness.

In this aspect of the invention, the color-gradated portion showing a gradation pattern is created by a thin boundary area of the upper and/or lower end of the colored resin layer. The gradation of color caused by the change in the thickness of the colored resin layer in the thin boundary area is emphasized in the background of the color of the main resin layer.

The color-gradated portion of the bottle is formed in the thin boundary area of the colored resin layer when the preform is biaxially drawn and blow molded into the bottle. At that time, the thin boundary area of the preform is further thinned by the biaxial drawing and blow molding, and there appears the color-gradated portion.

Another aspect of the invention also comprises that a transparent resin material is used for each of the main resin for molding the main resin layer and the colored resin for molding the colored resin layer.

In this aspect of the invention, any slight change in color in the color-gradated portion can be visualized, and thus, it is possible to widen the range of the color-gradated portion reasonably.

The means of carrying out another aspect of the invention is a preform, which is injection-molded into a bottomed cylindrical shape having a gate imprint at the center of bottom and which comprises the main resin layer, made of a main resin that forms the preform almost entirely, and the colored resin layer made of a colored resin having a different color from the color of the main resin and having been laminated with the main resin layer to become at least a part of the body of the preform, wherein an end portion of the colored resin layer in the body wall of the preform is gradually reduced in thickness by the flow behavior of the main resin during the injection molding to form the thin boundary area.

In this aspect of the invention, the colored resin is injected into the mold from the injecting machine to mold the preform. The material flows together with the main resin, and forms in the mold a cylindrical shape. Thus, the colored resin layer is formed in the position where this layer is laminated with the main resin layer made of the main resin.

The cavity of the mold for molding the preform body serves also as the passage for the molding materials injected into the mold. Both the main resin and the colored resin flow actively, while affecting each other. The flow behavior of the main resin has a strong impact especially on the end portion of the colored resin layer (the downstream and/or upstream portion along the flow direction of molten resins). Therefore, the end portion of the colored resin layer is gradually reduced in thickness toward the end of the layer to form the thin boundary area.

Under this configuration of the preform, the end portion of the colored resin layer disposed in the body wall is gradually reduced in thickness. When such a preform is biaxially drawn and blow molded into a bottle, the thin boundary area is more and more thinned to create a color-gradated portion where the gradation of color is continuous and light.

The timing of injecting the colored resin almost accurately determines the position of the thin boundary area on the body of the preform. As a result, it becomes possible to obtain a bottle decorated with a color gradation pattern stably.

Another aspect of the invention also comprises that the colored resin layer is embedded in the main resin layer.

This aspect of the invention is concerned with an actual laminar structure for the main resin layer and the colored resin layer. Various color patterns are created by the colored resin layer when this layer is affected by the color and/or transparency of the main resin layer.

Another aspect of the invention comprises that the biaxially drawn, blow-molded synthetic resin bottle in the invention has an intermediate layer made of a colored resin and formed in a certain height range, wherein the bottle is decorated with color gradations caused by a change in color density when the thickness of this intermediate layer is gradually reduced in the upward or downward direction at the upper or lower end of this layer.

In this aspect of the invention, there can be provided the bottle having new decorativeness in which sophisticated color gradation caused by the change in color density has been created by the intermediate layer.

Another aspect of the invention comprises that the above bottle of this invention is made of a PET resin and that color gradation has been achieved in such a way that the bottle wall changes gradually and continuously from a colored transparent state to a colorless transparent state over the area from the upper end of the shoulder down to the bottom.

In another aspect of the invention, there can be provided a PET bottle having new decorativeness, in which color gradation has been achieved in such a way that the bottle wall changes gradually and continuously from a colored transparent state to a colorless transparent state over the area from the upper end of the shoulder down to the bottom. The portion ranging from the top of the neck to the shoulder can also be decorated in color.

The means of carrying out the invention in another aspect of the invention comprises that a preform is used, which is molded by injecting molten resins into the mold through the gate disposed at a position opposed to the center of the bottom and is characterized by having an intermediate layer made of a colored resin and formed in a certain height range and by having a color-gradated portion created by a change in the thickness of the intermediate layer at its upper- or lower end when the thickness is gradually reduced in the upward or downward direction.

In another aspect of the invention, the preform has the intermediate layer in which a color-gradated portion is created by the change in the thickness of this intermediate layer at its upper- or lower end when the thickness is gradually reduced in the upward or downward direction. This preform is biaxially drawn and blow molded into a bottle having new decorativeness, in which sophisticated color gradation caused by the change in color density has been created by the intermediate layer made of the colored resin.

The means of carrying out another aspect of the invention comprises that, the change in the intermediate layer thickness for the color-gradated portion is shown by a condition of $L/t1 \geq 30$ where L is the length of the color-gradated portion and t1 is the layer thickness at the base of the color-gradated portion.

The above-described configuration is intended to specify the extent of color gradation created by the change in thickness of the intermediate layer formed in the preform to be used. Under the condition of $L/t1 \geq 30$, the layer thickness for the color-gradated portion is reduced as slowly as never before. As a result, there can be provided a bottle having new decorativeness, in which the color gradation effect derived from color density, coupled with the drawing effect from biaxial drawing and blow molding, has been created synergistically in a sophisticated manner.

Another aspect of the invention comprises that the colored resin layers are disposed on both of outer and inner surfaces of the main resin layer.

This aspect of the invention relates to an actual laminar structure for the main resin layer and the colored resin layer. In this aspect of the invention the color pattern created on the bottle walls is not affected by the color and/or transparency of the main resin layer, but truly corresponds to the colored resin layer of the preform.

The means of carrying out the invention in another aspect comprises that, colored layers are formed on the body of the bottle by a colored resin in the shape of double cylinders disposed in the inner- and outer-surface vicinities in a certain height range and that the thickness of these colored layers are reduced gradually in the upward direction to decorate the bottle with color density gradations.

In this aspect of the invention, it is possible to provide the bottle having new decorativeness in which highly sophisticated color density gradations.

The means of carrying out another aspect of the invention comprises that the bottle in the invention is made of a PET resin and that color density gradations are appeared changing gradually and continuously in the upward direction from the colored transparent state to the colorless transparent state in a certain height range covering from near bottom to shoulder.

In this aspect of the invention, there can be provided a PET bottle having new decorativeness, in which color gradations have been achieved in such a way that the bottle wall changes gradually and continuously from a colored transparent state to a colorless transparent state over the area from the shoulder down to the vicinity of the bottom.

The means of carrying out another aspect of the invention comprises that a preform is molded by a successive injection molding process, in which the colored resin is primarily injected as a short shot into the mold cavity by way of a gate disposed at the position opposed to the center of the bottom, followed by the second injection of main resin, i.e., the main raw material for molding the preform, with this second injection being given after a lapse of predetermined waiting time. The preform has colored resin layers in the shape of double cylinders in the inner and outer surface vicinities, and the thickness of these colored layers is gradually reduced in the upward direction to form color-gradated portions.

In this aspect of the invention, the preform has colored resin layers in the shape of double cylinders in the inner and outer surface vicinities and has layer thickness reduced gradually in the upward direction to form color-gradated portions. This preform is biaxially drawn and blow molded into the bottle having new decorativeness in which highly sophisticated color gradations caused by the change in color density are created by these colored layers.

Another aspect of the invention relates to a preform-molding process, and especially to a molding process for the preform to be biaxially drawn and blow molded into the bottle decorated with a gradation pattern, in which the above-described colored resin layer is embedded in the main resin layer. The molding process generally comprises:

flowing molten synthetic resins through at least three layer-forming channels of a cylindrical inner flow channel, a middle flow channel, and a cylindrical outer flow channel;

flowing the resins through a confluence disposed downstream of these layer-forming channels and through a joined flow channel;

passing the resins through a gate disposed at a position opposed to center of bottom; and injecting the resins into mold to form a preform; and further comprises:

supplying the inner flow channel and the outer flow channel with the main resin for the preform from at least one loader at a predetermined time span, pressure, or velocity;

supplying the middle flow channel with a colored resin from another loader at a predetermined pressure and/or velocity during a predetermined time within said time span;

allowing the colored resin to join the main resin from the inner flow channel and the outer flow channel at the confluence in such a manner that the layer of colored resin is sandwiched between the two layers of the main resin;

forming a multi-layered molten resin fluid having an intermediate layer of the colored resin between the layers of main resin within the joined flow channel over a certain span of time;

adjusting the injection pattern including the time of starting and ending the supply of the colored resin, pressure, or velocity profiles; and reducing the thickness of this intermediate layer at an upstream or downstream point of the flow gradually in the upstream or downstream direction so as to form a color-gradated portion.

In what is called the simultaneous injection molding, a gas barrier resin that forms the intermediate layer is injected together with the main resin, i.e., the main raw material for preform, for a certain period within a span of time when the main resin is being injected. In such a process, the inventors of this invention have found that an end of the intermediate layer is not cut instantly but is gradually drawn and reduced in thickness, depending on the condition of injection, and have made this invention from that discovery. It should be noted here that this aspect and the later described aspects of the invention describe "pressure and/or velocity" to include the cases where both the pressure and the velocity are set in controlling the supplies of resins because the injection molding process of this invention is carried out by setting the resin supply pressure or velocity or both at predetermined levels.

According to the molding process of this aspect of the invention, the colored resin flows through the middle flow channel, and at the confluence, is sandwiched between the main resin fluids coming from the inner and outer flow channels to form the intermediate layer. At the time when the colored resin starts flowing in or comes to the end of flow, an end of this intermediate layer deforms under the interaction between the end of the colored resin fluid and the main resin fluids coming from the inner and outer flow channels.

At that time, the injection pattern is adjusted, including the time of starting and ending the supply of colored resin, and the supply pressure and/or velocity profiles. This adjustment allows an end of the intermediate layer to be deformed by the shearing flow or the elongational flow to assume the shape of a wedge or a gradually narrowing thread, as viewed in the vertical section.

By reducing the layer thickness gradually in the upstream or downstream direction, it is possible to form a color-gradated portion caused by the change in thickness. If the preform thus molded is biaxially drawn, color gradations are created by the change in color density in the upward or downward direction, and there is provided a synthetic resin bottle newly decorated with such gradations. The middle flow channel to be used by the colored resin is not limited to a cylindrical shape, but can be in the cross-sectional shape of, for example, a thin-plate rectangle. The flow channel in such a shape leads to a bottle decorated with the colored resin layer having vertical strips of gradations that extend in the upward or downward direction in the predetermined area of the molded product.

The molding process according to another aspect of the invention comprises that the middle flow channel is also disposed coaxially as a cylindrical channel together with the inner and outer flow channels.

The molding process enables the color-gradated portion associated with the thickness of the intermediate layer to be formed in the upward or downward direction around the entire preform body. Thus, a bottle can be provided, in which color gradations caused by the change in color density are created sophisticatedly in the upward or downward direction around the body of the bottle.

The molding process according to another aspect of the invention comprises that the supply pressure and/or velocity is gradually reduced at the time when the supply of the colored resin comes to an end, so that a color-gradated portion is formed at the upstream end of the intermediate layer.

Based on the molding process of this aspect of the invention, the supply pressure and/or velocity is gradually reduced at the ending point of time. As a result, the volume of supply resin or the thickness of the intermediate layer is reduced toward the upstream. The upstream end is extended and deformed to assume the shape of a gradually narrowing thread, as viewed in the vertical section.

The molding process according to another aspect of the invention comprises that the colored resin is allowed to remain in the vicinity of the confluence where the colored resin joins the main resin, at the time when the supply of the colored resin comes to an end and that this remaining colored resin is drawn by the flow of the main resin in the downstream direction to form a color-gradated portion in the shape of a gradually narrowing thread at the upstream end of the intermediate layer.

After the supply of the colored resin is stopped, the force of advancing the colored resin flow from upstream of the middle flow channel does not act on the colored resin remaining at the confluence of the middle flow channel. In the molding process of this aspect of the invention, the force of the main resin flow acts on the remaining colored resin to draw and deform so that the thickness of the intermediate layer is changed at the upstream end to assume the shape of a gradually narrowing thread.

The molding process according to the invention of another aspect of the invention comprises that the supply pressure and/or velocity is gradually increased at the time when the supply of colored resin is started, so that a color-gradated portion is formed at the downstream end of the intermediate layer.

In this aspect of the invention, the pressure and/or velocity of colored resin supply is gradually increased when the supply is started. In other words, the volume of the supplied resin, or the thickness of the intermediate layer, is increased in the upstream direction. In this manner, a color-gradated portion thus formed shows a gradually narrowing thread in the downstream direction.

The molding process according another aspect of the invention comprises that the colored resin has a molten viscosity that is lower than the viscosity of the main resin so that the intermediate layer of the multi-layered molten resin fluid is deformed to assume the shape of a gradually narrowing thread at either upstream or downstream end.

In the molding process of this aspect of the invention, either end of the intermediate layer is deformed at or near the confluence when it is affected by the action of the main resin flows coming from the inner and outer flow channels. If the colored resin has a low viscosity, this action proceeds effectively, and the layer thickness at one end can be changed to the shape of a gradually narrowing thread. Especially in the case of extending deformation, the low viscosity prevents the molten resin from being discontinued and easily achieves the change into the gradually narrowing thread.

The molding process according to the invention of another aspect of the invention comprises that a valve to open or close the channel is disposed between the colored-resin loader and the middle flow channel and that the color-gradated portion is formed at either downstream or upstream end of the intermediate layer of the multi-layered molten resin fluid, depending on the type of this valve or the switching method.

Since resins have viscoelastic properties, the type of valve or the switching velocity can be adjusted in the molding process of this aspect of the invention so that the colored resin pressure is changed delicately at the confluence when the supply of colored resin begins or comes to an end. As a result, it is possible for the upstream or downstream end of the intermediate layer to have the layer thickness effectively changed into the shape of a gradually narrowing thread. If use is made of, for example, a valve capable of quickly opening or closing the flow, such as a ball valve, then the supply of colored resin can be brought to a stop at once, and the upstream end of the intermediate layer is drawn to reduce the layer thickness effectively into the shape of a gradually narrowing thread.

The molding process according to another aspect of the invention of comprises that use is made of two loaders and three layer-forming channels of an inner flow channel, a middle flow channel, and an outer flow channel and that the main resin from one loader is supplied to both the inner flow channel and the outer flow channel, and that the colored resin, i.e., colored main resin, from the other loader is supplied to the middle flow channel.

The molding process of this aspect of the invention relates to a practical laminar structure. The entire preform is made of the same resin, regardless of colored resin or not, and stable molding operation can be accomplished by using the same resin.

The molding process according to another aspect of the invention comprises that both the main resin and the colored resin are transparent materials.

The molding process of this aspect of the invention can create the color gradation effect more visibly by the transmission of light. Thus, the bottle having a new decorative effect can be provided.

This invention also may relate to the preform-molding process, and in particular, to the preform-molding process wherein the preform thus obtained is biaxially drawn and blow molded into the bottle decorated with gradation patterns in which colored resin layers are disposed on both of outer and inner surfaces of the main resin layer, as described in the invention. The molding process in one aspect of the invention is a process for molding a preform for use in biaxial drawing and blow molding, which comprises:

giving a primary injection of colored resin as a short shot to the mold cavity by way of the gate located at a position opposed to the center of bottom;

after a lapse of waiting time from the end point of primary injection, giving successively a secondary injection of main resin, i.e., the major material forming the preform;

adjusting this waiting time so that the main resin from the secondary injection is allowed to flow through the cavity in a manner in which the main resin penetrates the central part of the colored resin located inside the cavity of the mold in the short shot state;

forming colored layers made of the colored resin in the shape of double cylinders at positions near the inner surface and outer surface of the preform; and thus forming color-gradated portions where the colored layers are reduced in thickness in the upward direction of the preform.

According to the molding process in one aspect of the invention, the colored resin is injected as a short shot in the primary injection, which is followed by the secondary injection of main resin after a predetermined lapse of waiting time. In this way, the lapse of waiting time allows the short shot of colored resin to cool in and near the portion coming in contact with cavity mold surface and core mold surface (hereinafter collectively referred to as mold surface vicinity). The resin in this portion cools and solidifies, or molten viscosity increases progressively. By adjusting and setting a suitable waiting time, it is possible to proceed with the cooling of the primarily injected colored resin in the mold surface vicinity, while retaining a high temperature in the central part of the cavity.

If the main resin is secondarily injected in a successive manner under the above-described condition, the main resin in the molten state passes through the gate at the position opposed to the bottom center of the preform, and then through the central part of the colored resin in the cavity. The main resin flows toward the portion corresponding to the top end of the neck to fill the cavity, while dragging a part of the colored resin. At that time, the colored resin located in the mold surface vicinity, especially the resin quite near the mold surfaces, does not flow, but remains at the primarily injected position. On the other hand, some molten colored resin is dragged in the flowing direction. As a result, the colored resin, especially the forefront of the flow, has a gradually reduced thickness in the flow direction to form a color-gradated pattern.

In the preform molded by successive injections such as described above, the colored resin layers made of a colored resin are formed in double cylinders on the inner and outer surfaces of the main resin layer. These colored resin layers have a gradually reduced thickness in the upward direction of the preform to form a color-gradated portion. Depending on the molding condition or the height position of the preform, the main resin layers of thin film are formed on the inside and/or outside of these colored layers, thus forming the innermost surface and/or outermost surface. For this reason, the term "inner and outer surface vicinity" is used to include these innermost and/or outermost surfaces.

As described above, a technical idea for the molding process involves setting a suitable waiting time between the primary injection and the secondary injection in a successive injection molding process and utilizing the difference in the extent of cooling between the mold surface vicinity and the central part of the colored resin injected into the cavity as a short shot, whereby a part of the colored resin is dragged in the flowing direction by the flow of the later-injected main resin to form color-gradated portions caused by the change in layer thickness The extent of thickness-related color gradation or the change in layer thickness can be controlled by the conditions of successive injections, such as the volumes of primary and secondary injections, the injection velocity, pressure, and temperature, and the waiting time, and also by the molten viscosity of the resin in use.

The molding process in another aspect of the invention comprises that the extent of color gradation caused by the change in thickness of the colored layers is controlled by a combination of the waiting time, the secondary injection velocity, and the injection pressure.

In this method of another aspect of the invention, the extent of color gradation caused by the change in thickness of the colored layers can be controlled relatively easily by adjusting the waiting time, the secondary injection velocity, and the injection pressure. If a short waiting time, a fast secondary injection velocity, and a high injection pressure are used, the layer thickness can be changed slowly to form gradually narrowing threads at the forefront of colored layers.

The molding process in the invention of another aspect of the invention comprises that the colored main resin is used as the colored synthetic resin.

The molding process of this aspect of the invention ensures that the entire preform is molded by the same resin. The preform can be molded stably because the colored resin and the main resin are made of the same resin.

The molding process in another aspect of the invention comprises that the colored resin has a relatively low molten viscosity than that of the main resin.

In the molding process of this aspect of the invention, the short shot of colored resin deforms as it is affected by the main resin flow that passes through the central part. If the colored resin has a low viscosity, this action of the flow becomes more effective, and the layer thickness can be changed to the shape of a gradually narrowing thread at the forefront.

The molding process in another aspect of the invention comprises that both the main resin and the colored resin are transparent resins.

The molding process of this aspect of the invention can create the color gradation effect caused by the change in color shades much more visibly through the transmission of light. Thus, the bottle having a new decorative effect can be provided.

The molding process of another aspect of the invention comprises that a preliminary injection of the main resin is given in a predetermined amount before the primary injection.

In the case of successive injection molding process of this invention, a series of basic operations include the primary injection of colored resin, the waiting time, and the secondary injection of main resin. The molding process according to this aspect of the invention involves injecting a predetermined amount of the main resin before the primary injection. Depending on the purpose of decoration for the bottle, the position at which colored layers are formed on the preform can be arbitrarily set by injecting a predetermined amount of main resin before the primary injection.

At the time of primary injection of colored resin after the preliminary injection, the colored resin is forced to pass through the central part of a short shot of the main resin that has been injected preliminarily, while dragging this main resin over the mold surfaces. In this manner, both the outer surface (outermost layer) and the inner surface (innermost layer) can be constructed with this main resin. Since the contents of the bottle do not come in direct contact with the colored resin, the user feels at ease in utilizing the bottle.

Other aspects of the invention also relate to the preform-molding process, and in particular, to a process for molding a preform having multiple colored resin layers of a laminar structure, in which each layer is made of a colored resin of a different color shade, and in which the thickness of these colored resin layers is gradually changed in the upward or downward direction. Among others, the molding process in one aspect of the invention is a process for molding a preform for use in biaxial drawing and blow molding, in which multiple resins including at least one colored resin are successively injected into the cavity of a mold by way of a gate located at the position opposed to the center of bottom, and which comprises injecting initially a short shot of a colored resin into the cavity of the mold, then injecting a second resin and letting the second resin wedge its way through central part of the earlier injected colored resin to form laminated layers, and forming a color-gradated portion in the colored layer in such a way that thickness of the colored layer made of the first colored resin injected earlier is gradually reduced toward the bottom.

According to the molding process of this aspect of the invention, the earlier injected colored resin existing in the mold cavity in the state of a short shot has a higher resin temperature and a lower molten viscosity at the central part distant from the cavity wall than in the vicinity of the cavity wall. The later injected resin wedges its way through this central part. As a result, the colored layer made of the earlier injected resin comes to have a portion with its thickness reduced gradually in the upstream direction toward the gate position.

In the preform thus molded, it is possible for the colored layer made of the earlier injected colored resin to have a color-gradated portion associated with the thickness of the colored layer that is reduced in the direction toward the bottom.

In the molding process of this aspect of the invention, preforms in various laminar structures can be obtained for any purpose of decoration by the successive molding in the steps illustratively shown below. These preforms can be biaxially drawn and blow molded into bottles variously decorated in colors.

(1) A colored transparent resin/A colorless transparent resin
(2) A colored transparent resin/A colorless transparent resin/A colored transparent resin
(3) A colored transparent resin/A transparent resin of a different color/A colorless transparent resin
(4) A colored transparent resin/A transparent resin of a different color/A transparent resin of still another color/A colorless transparent resin Of course, depending on the purpose, there can be utilized not only transparent resins but also translucent or opaque resins. The same resins with different colors or the resins of different types, too, can be utilized.

For example, in the case of (3), resins are successively injected in the order of the first colored transparent resin, the second transparent resin in a color different from the first resin, and the third colorless transparent resin. The second resin wedges its way through the central part of the first resin inside the cavity. Then, the third resin wedges its way through the central part of the second resin. Consequently, the preform has color-gradated portions associated with the thickness of the colored layers in such a way that the color-gradated portion created by the first colored transparent resin overlaps partially that of the second colored transparent resin. When such a preform is biaxially drawn and blow molded into a bottle, there can be provided the bottle decorated with gradations in which color density and color shade change together gradually and continuously.

The extent of gradations caused by the thickness of colored resin layers, i.e., the aspect of change in thickness, can be controlled for any purpose by such conditions as the volume of injection, the speed and pressure of injection, the temperatures of injected resins, and the mold temperature for each resin, and by the levels of molten viscosity of resins to be used.

The molding process of another aspect of the invention comprises that the extent of gradation associated with the thickness of the colored layer made of the earlier injected colored resin is controlled by a combination of injection speed and pressure of the later injected resin.

The above-described process ensures that the extent of gradation associated with the thickness of the colored layer can be relatively easily controlled by the combination of the speed and pressure of injection among other conditions of successive injections.

The molding process of another aspect of the invention comprises that the resins are successively injected in 3 steps.

Resins are successively injected in 3 steps according to the molding process of this aspect of the invention. This process can be accomplished relatively easily from the aspects of equipment and process steps. As shown below, resins can be injected in 3 steps in various combinations of 2 or 3 resins that give the bottle different color shades, depending on the purpose of decorations.
(1) A colorless transparent resin/A colored transparent resin/A colorless transparent resin
(2) A colored transparent resin/A colorless transparent resin/A transparent resin of the same color
(3) A colored transparent resin/A colorless transparent resin/A transparent resin of a different color
(4) A colored transparent resin/A transparent resin of a different color/A colorless transparent resin
(5) A colored transparent resin/A transparent resin of a different color/A transparent resin of still another color As the base resin except for the coloring components, the same resin can be utilized in all the combinations. One of the resins may have a low molten viscosity, or resins of different types can also be used. Depending on the purpose, translucent or opaque resins or colored opaque resins can also be used.

The molding process of the invention according to another aspect of the invention comprises that the colored resin to be injected earlier has a lower molten viscosity than the later injected resin has.

The molding process of this aspect of the invention ensures that the later injected resin wedges its way through the central part of the earlier injected colored resin in the state of a short shot to form a color-gradated portion in the preform. Since the colored resin is given a low molten viscosity in the molding process of this aspect of the invention, this color-gradated portion is formed more effectively than before, and the thickness of the colored resin can be reduced to have the shape of a gradually narrowing thread, as viewed in the vertical section of the body wall.

The molding process of the invention according to another aspect of the invention comprises that each resin used in this process is a transparent resin.

The molding process of this aspect of the invention makes it possible to create a color-gradated effect caused by color density or color shade due to the light transmission through the bottle, which is the end product, and to provide the bottle having a new decorative effect.

The means of carrying out another aspect of the invention is a preform for use in biaxial drawing and blow molding, which is molded by the successive injection process, in which multiple resins including at least one colored resin are successively injected into the cavity of the mold by way of the gate located at the position opposed to the center of the bottom. This preform is characterized in that having a color-gradated portion formed by the colored resin layer made of the earlier injected colored resin, with thickness of the colored resin layer in this portion being gradually reduced toward the bottom by the flow action of the second resin that wedges its way through the central part of the earlier injected colored resin.

The preform of this aspect of the invention having above-described configuration can be obtained by the successive injection molding process described above. This preform is biaxially drawn and blow molded into a bottle having new decorativeness, in which sophisticated color gradation derived from the change in color density, color shade, or both is created by the colored resin layer made of a colored resin.

Another aspect of the invention relates to a bottle. The means of carrying out the invention in one aspect of the invention is a synthetic resin bottle obtained by biaxially drawing and blow molding the preform which is molded by the successive injection process in which multiple resins including at least one colored resin are successively injected into the cavity of the mold by way of the gate located at a position opposed to the center of the bottom. This preform has a color-gradated portion formed by the colored layer made of the earlier injected colored resin, and the thickness of the colored layer in this portion is gradually reduced toward the bottom by the flow action of the second resin that wedges its way through the central part of the earlier injected colored resin. As a result, the bottle is decorated with color gradations created by the gradual change toward the bottom in the thickness of the colored resin layer made of the earlier injected colored resin and by the subsequent change in color density, color shade, or both, which is caused to occur in a continuous manner.

The above-described bottle can be obtained from the above-described preform which is obtained by the above-described molding process. This preform is biaxially drawn and blow molded into a bottle having new decorativeness, in which sophisticated color gradation derived from the change in color density, color shade, or both is created by the colored resin layer made of a colored resin.

The means of carrying out another aspect of the invention comprises that, the bottle is made of a polyethylene terephthalate resin, wherein gradations are created by the continuous and gradual changes in color density and color shade that occur in three colored resin layers made of three differently colored resins.

From the above-described configuration, there can be provided a PET resin bottle having new decorativeness, in which sophisticated gradations in three colors are created by the continuous and gradual changes in color density and color shade.

Effects of the Invention

This invention having above-described configurations has the effects described below. One aspect of the invention relates to a bottle decorated with a gradation pattern. Highly decorative effects derived from the patterns of color gradation can be achieved in the invention because such patterns of color gradation are created by the changes in color density on the bodies of biaxially drawn, blow-molded bottles.

The area of the created pattern of gradation can be widened, and gentle color density can be achieved to create the pattern of gradation that gives light decorative effects.

If a transparent resin is used, the area covered with a gradation pattern can be widened so reasonably that it is easy to obtain a large pattern of gradation.

The preform to be used may have a structure in which one end of the colored resin layer located on the body has its thickness reduced gradually to form a thin boundary area. When this preform is biaxially drawn and blow molded into a bottle, the thin boundary area of the bottle becomes more and more thin, and gives an area decorated with color gradations in which change in color density is continuous and light.

The timing of colored resin injection precisely determines the position of the thin boundary area at the end of the colored resin layer on the preform body. The bottle having a stable color gradation pattern can be obtained by this timing of injection.

One aspect of this invention relates to a practical laminar structure for the main resin layer and the colored resin layer. The colored resin layer may be embedded in the main resin layer. Under this configuration, various color patterns are obtained due to the color and/or transparency of the main resin layer.

In another aspect of the invention, the bottle has an intermediate layer made of a colored resin over a certain height range and is decorated with color gradations created by the change in color density when the thickness of this intermediate layer is gradually reduced in the upward or downward direction.

In another aspect of the invention, there can be provided a PET resin bottle having new decorativeness, in which color gradation has been achieved in such a way that the bottle wall changes gradually and continuously from a dark colored transparent state to a colorless transparent state over the area from the upper end of the shoulder down to the bottom.

In another aspect of the invention, a color-gradated portion is created by a change in the thickness of the intermediate layer made of a colored resin wherein the thickness gradually reduced in the upward or downward direction. The preform having such a color-gradated portion is biaxially drawn and blow molded into the bottle having new decorativeness in which color gradation caused by the change in color density is created.

Another aspect of the invention is intended to specify the extent of color gradation associated with the colored resin layer thickness of a preform. Under the condition of $L/t1 \geq 30$, the layer thickness for the color-gradated portion is reduced as slowly as never before. When the preform thus obtained is biaxially drawn and blow molded, there can be provided a bottle having new decorativeness, in which the color gradation effect, coupled with the drawing effect fulfilled during the biaxial drawing and blow molding, has been created synergistically in a sophisticated manner.

Another aspect of the invention relates to another practical laminar structure for the main resin layer and the colored resin layer, and ensures that the color pattern created on the bottle walls is not affected by the color and/or transparency of the main resin layer, but is faithfully correspondent with the colored resin layer of the preform.

In another aspect of the invention, there can be provided a bottle having new decorativeness in which colored resin layers have been formed on the body by a colored resin in the shape of double cylinders disposed in the inner- and outer-surface vicinities in a certain height range and in which the thickness of these colored resin layers are reduced gradually in the upward direction to decorate the bottle with sophisticated color gradations associated with the change in color density of the colored resin layers.

In another aspect of the invention, there can be provided a PET bottle having new decorativeness, in which color gradations have been achieved in such a way that the bottle wall changes gradually and continuously from a colored state to a colorless state over the area from the vicinity of the bottom up to the shoulder.

In another aspect of the invention, a bottle having sophisticated color gradations associated with the change in color density can be provided by the colored resin layers made of a colored resin in the shape of double cylinders and disposed in the inner- and outer-surface vicinities. Such a bottle can be molded by biaxially drawing and blow molding the preform having color-gradated portions caused by the gradual reduction of layer thickness in the upward direction.

Other aspects of the invention relate to a preform-molding process, and in particular, to a preform-molding process wherein the preform is biaxially drawn and blow molded into the bottle having a gradation pattern in which a colored resin layer is located inside the main resin layer. In one aspect of the invention, the injection pattern is adjusted, including the time of starting and ending the supply of colored resin, and the supply pressure and/or velocity profiles. Because of this adjustment, an end of the intermediate layer is deformed by the shearing flow or the elongational flow to assume the shape of a wedge or a gradually narrowing thread, as observed in the vertical section. By reducing the layer thickness gradually in the upstream or downstream direction, it is possible to form a color-gradated portion caused by the change in thickness.

In another aspect of the invention, the color-gradated portion associated with the thickness of the intermediate layer can be formed in the upward or downward direction around the entire preform body. When this preform is biaxially drawn and blow molded, a bottle can be provided, in which sophisticated color gradations caused by the change in color density are created in the upward or downward direction around the body of the bottle.

In another aspect of the invention, the supply pressure and/or velocity is gradually reduced at the end of the colored resin supply. As a result, the volume of supplied resin or the thickness of the intermediate layer is reduced toward the upstream. The upstream end is extended and deformed to assume the shape of a gradually narrowing thread, as viewed in the vertical section.

In another aspect of the invention, the force of advancing the colored resin flow from upstream of the middle flow channel does not act on the colored resin remaining at the confluence of the middle flow channel after the supply of the colored resin has been stopped. When the force of the main resin flow acts on the remaining colored resin, the latter resin is drawn and deformed so that the thickness of the intermediate layer at the upstream end is changed to assume the shape of a gradually narrowing thread.

In another aspect of the invention, the pressure and/or velocity of colored resin supply is gradually increased when the supply is started. In other words, volume of the supplied resin or thickness of the intermediate layer is increased in the upstream direction. In this manner, a color-gradated portion thus formed shows the shape of a wedge in the downstream direction at the downstream end.

If the colored resin has a low viscosity in another aspect of the, the layer thickness at one end can be changed more effectively to the shape of a gradually narrowing thread. Especially in the case of elongational deformation, the low viscosity prevents the molten resin from being discontinued and more easily makes the change into the gradually narrowing thread.

In another aspect of the invention, the type of valve or the switching velocity can be adjusted so that the colored resin pressure is changed delicately at the confluence when the supply of colored resin begins or comes to an end. As a result, it is possible for the upstream or downstream end of the intermediate layer to have the layer thickness effectively changed into the shape of a gradually narrowing thread.

In another aspect of the invention, the molding process relates to a practical laminar structure. The entire preform is made of the same resin, whether it is colored or not, and stable molding operation can be achieved by using the same resin.

In another aspect of the invention, the molding process can create the color gradation effect more visibly by the transmission of light. Thus, the bottle having a new decorative effect can be provided.

Other aspects of the invention also relate to a preform-molding process, and in particular, to a preform-molding process wherein the preform is biaxially drawn and blow molded into the bottle having a gradation pattern in which colored resin layers are located on both the inner and outer surfaces of the main resin layer. In one aspect of the invention, the colored layers made of a colored resin are formed in the shape of double cylinders in the inner- and outer-surface vicinities by the successive injection molding, with a waiting time set in between. As a result, there can be obtained the preform in which color-gradated portions are formed wherein the thickness of the colored resin layers is reduced gradually toward the top end of the preform.

If a short waiting time, a fast secondary injection velocity, and a high injection pressure are used in one aspect of the invention, the layer thickness can be changed slowly to form gradually narrowing threads at the forefront of colored resin layers.

In another aspect of the invention, the entire preform can be molded by the same resin. Because the colored resin and the main resin are made of the same resin, the preform can be molded stably.

In another aspect of the invention, the forefront portion of the colored resin layers can be changed to the shape of gradually narrowing threads by giving a low viscosity to the colored resin.

In another aspect of the invention, the molding process can create the color gradation effect more visibly by the transmission of light. Thus, the bottle having a new decorative effect can be provided.

In another aspect of the invention, a predetermined amount of the main resin is injected before the primary injection. Depending on the purpose of decoration for the bottle, it is possible to set arbitrarily the position of colored resin layers on the preform. In addition, the outer- and inner-surfaces can be covered with the main resin. Since the contents are not in direct contact with the colored resin, the user may feel at ease in using the bottle.

Other aspects of the invention also relate to a preform-molding process, and in particular, to a preform-molding process wherein the preform is biaxially drawn and blow molded into the bottle having multiple colored resin layers of a laminar structure, in which each layer is made of a colored resin of a different color shade, and having a gradation pattern in which the thickness of these colored resin layers is reduced gradually in the upward or downward direction. In one aspect of the invention, the second resin wedges its way through the central part of the earlier injected colored resin, and the flow action of the second resin allows the layer of the earlier injected colored resin to form a color-gradated portion having thickness gradually reduced toward the bottom. Preforms in various laminar structures can be obtained by the variations in the successive molding process. Bottles newly decorated in colors and with various patterns can be obtained by biaxially drawing and blow molding these preforms.

In another aspect of the invention, a combination of injection speed and injection pressure, among other conditions of successive injections, can be used to control the extent of gradations caused by the change in thickness of the colored resin layers relatively easily.

Another aspect of the invention is a process for injecting resins successively in 3 steps. This process can be accomplished relatively easily from the points of view of equipment and process steps. Two or three resins can be combined in various embodiments including color shades of the colored resins, depending on the purpose of decorations.

In another aspect of the invention, the colored resin has such a low level of viscosity that the color-gradated portions are effectively formed, thus enabling the thickness of the colored resin layers to be changed into the shape of a gradually narrowing thread in the vertical section of the body wall.

In another aspect of the invention, the transparent resins make it possible to create the gradation effect more visibly by the transmission of light. Thus, the bottle with a new decorative effect can be provided.

Another aspect of the invention relates to a preform, which can be used to provide the bottle having new decorativeness in which highly sophisticated color gradations caused by the changes in color density, color shade, or both are created by the colored resin layer or layers when the preform is biaxially drawn and blow molded into the bottle.

Other aspects of the invention relate to a bottle having a gradation pattern. In one aspect of the invention, there can be provided a bottle having new decorativeness in which highly sophisticated gradations caused by the changes in color density, color shade, or both can be created by the colored resin layer or layers.

In another aspect of the invention, it is possible to provide a PET resin bottle having new decorativeness, in which gradations are created in three colors by the continuous and gradual changes in color density and color shade.

BRIEF DESCRIPTION OF THE DRAWINGS

FIG. 10 is an explanatory diagram showing the steps of filling the mold cavity with molten resins in the injection pattern of FIG. 9.

FIG. 19 is a schematic explanatory diagram showing the process steps of filling the mold cavity with molten resins according to the injection pattern of FIG. 16.

FIG. 24 is a series of schematic diagrams showing the steps of filling the mold cavity with molten resins according to the injection pattern of FIG. 23.

FIG. 26(*b*) is a vertical section of bottle wall, partly enlarged in the lateral direction.

EXPLANATION OF CODES

Figure 1:
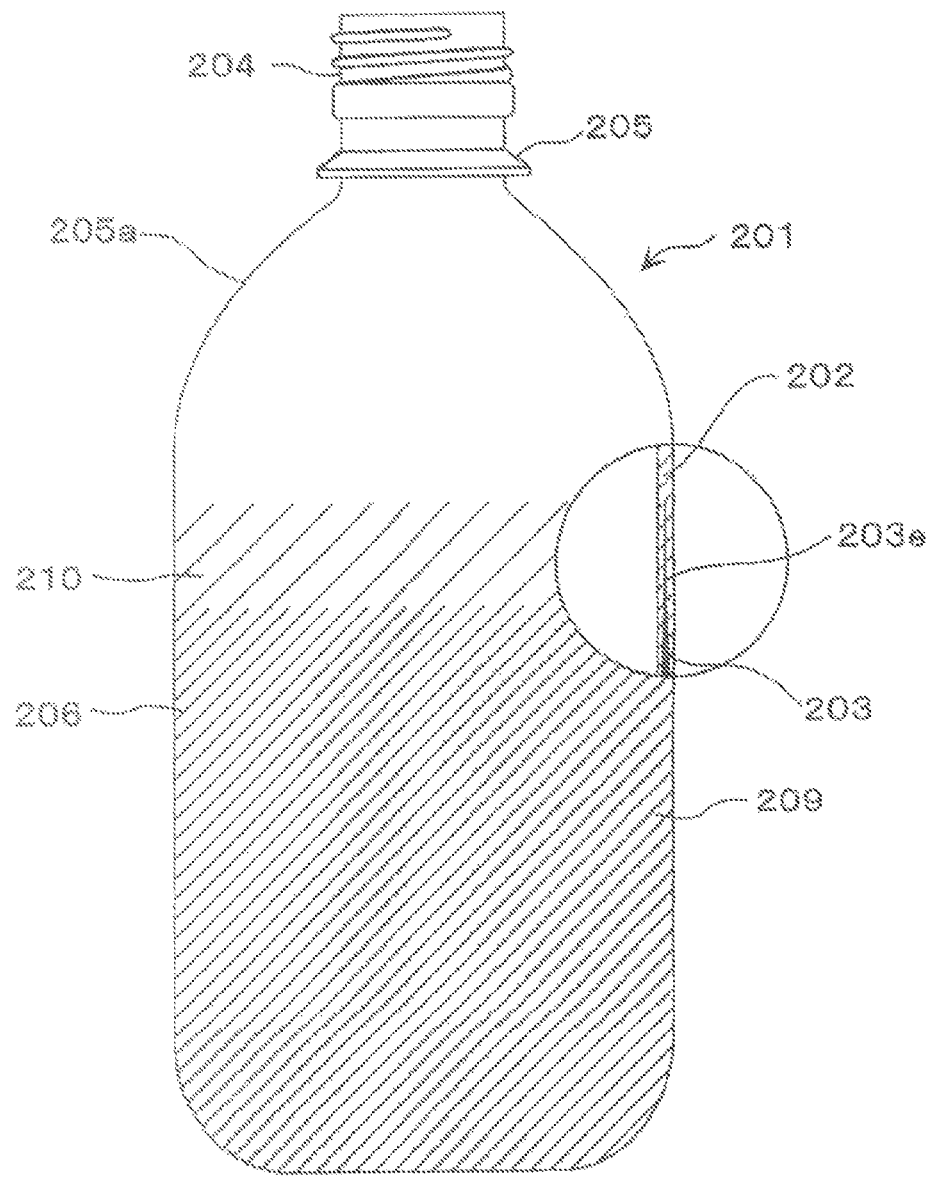
FIG. 1 is an overall view of the bottle in the first embodiment of this invention, with a part of the wall layer shown in an enlarged vertical section.

1. Mold
2. Core mold
3. Cavity mold
4. Cavity
5. Gate
11. Multiple nozzle section
12*a*. Feed channel for the main resin
12*b*. Feed channel for the colored resin
14*a*1, 14*a*2, 14*b*. Manifold
15. Inner flow channel
16. Middle flow channel
17. Outer flow channel
18. Confluence
19. Joined flow channel
20. Shut-off pin
21. Hot runner block
22*a*. Main resin feed port
22*b*. Colored resin feed port
23*a*. Main resin channel
23*b*. Colored resin channel
25. Check valve
A. Main resin loader
B. Colored resin loader
31. Main resin
32 (32*f*, 32*s*, 32*t*). Colored resin
32*a*, 32*b*, 32*fa*, 321*b*. Mold surface vicinity
32*c*, 32*fc*. Central part of the cavity
33. Forefront
101. Preform
102. Main resin layer
103 (103*f*, 103*s*, 103*t*). Colored resin layer
103*e*. Thick end
103*d*. Downstream end
103*u*. Upstream end
103*m*. Intermediate layer
104. Neck
105. Neck ring
106. Body
107. Bottom
108. Downstream end
109. Upstream end
110 (110*f*, 110*s*). Color-gradated portion
110*a*. Base
201. Bottle 202. Main resin layer
203 (203f, 203s, 203f). Colored resin layer
203e. Thick end
203m. Intermediate layer
204. Neck
205. Neck ring
205a. Shoulder
206. Body
207. Bottom
209. Color-decorated portion
210. Color-gradated portion
h1, h2. Height range
Wf1, Wf2, Ws. Range
hf, hs. Height range
Jp. Preliminary injection
J1. Primary injection
J2. Secondary injection
J3. Tertiary injection
t1 to t4. Time

PREFERRED EMBODIMENTS OF THE INVENTION

This invention is further described with respect to the preferred embodiments of the preform-molding process, the preform, and the bottle, now referring to the drawings. The first embodiment (FIG. 2), the second embodiment (FIG. 3), and the third embodiment (FIG. 5) of the preform of this invention, as well as the first embodiment (FIG. 1), the second embodiment (FIG. 4), and the third embodiment (FIG. 5) of the bottle of this invention, are described, referring to FIGS. 1 to 6.

FIG. 1 is an overall view of the bottle 201 in the first embodiment of this invention, with a part of the wall layer shown in an enlarged vertical section, which bottle has been biaxially drawn and blow molded from the preform in the first embodiment of this invention. The bottle 201 comprises a body 206 in a bottomed cylindrical shape, shoulder 205a at the upper end of the body 206, and a neck 204 having screw thread notched on the outer peripheral wall and having a brim-like neck ring 205 at the lower end of the neck 204. The lower half of the body 206 has a laminar structure in which the main resin layer 202 is laminated with the colored resin layer 203. The area at the upper end of the color-decorated portion 209 created by the colored resin layer 203 in the lower half of the body 206 is the color-gradated portion 210 created in the thin boundary area 203e.

As shown in the embodiment of FIG. 1, the color-gradated portion 210 is disposed in the central area of the body 206, and the gradated decoration is quite effectively displayed.

Figure 2:
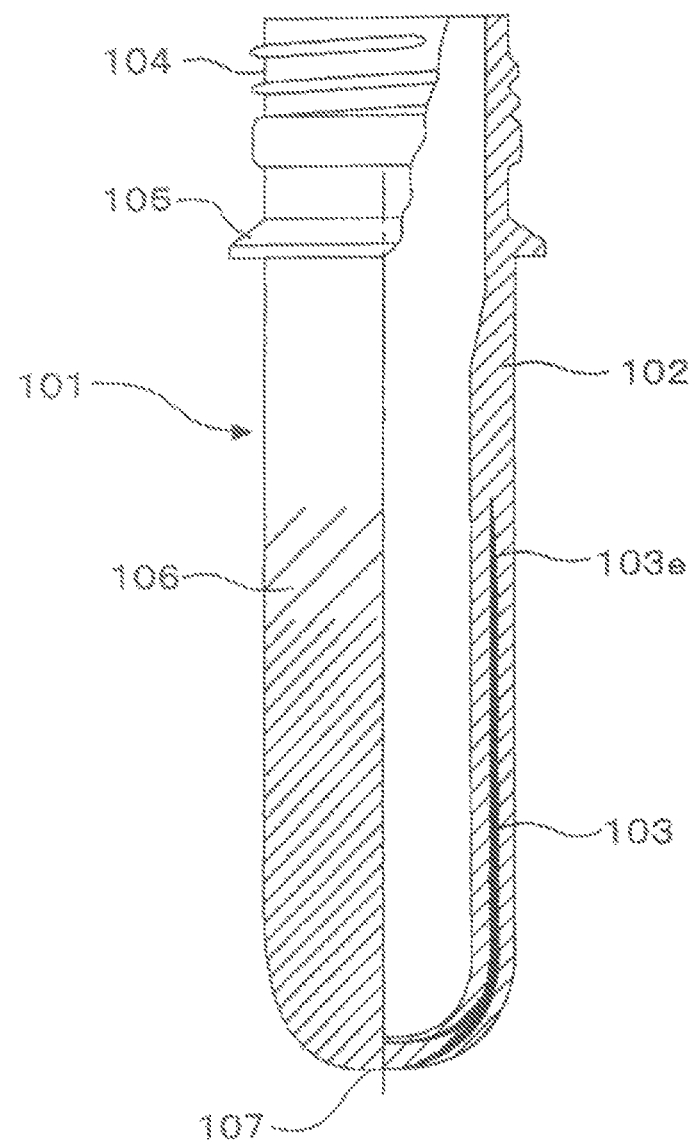
FIG. 2 is a front elevational view of the preform in the first embodiment of this invention, with the irregularly cut right half portion being shown in a vertical section.

FIG. 2 is a front elevational view of the preform 101 in the first embodiment of this invention, with about a half shown irregularly in a vertical section. This preform 101 comprises a cylindrical body 106 closed at its lower end by a semi-spherical bottom 107 having a gate imprint at the bottom center and a cylindrical neck 104 having a screw thread notched on the outer peripheral wall and having a brim-like neck ring 105 at the boundary between the neck 104 and the body 106. The colored resin layer 103 is formed by a colored resin when a clear and colorless main resin and a clear and colored resin are injected. The thin boundary area 103e is designed to take a position on the body 106 at the upper end of the colored resin layer 103.

The lower end of the colored resin layer 103 is slightly reduced in thickness, but since the lower end is disposed at the bottom 107, this portion does not serve as a color-decorated portion in the overall appearance of the bottle 106. Since the bottom 107 of the preform 101 is hardly drawn and deformed, it is kept from accelerated wall thinning movement caused by the elongational deformation. Thus, the bottom 107 has no effective function as a decorative portion.

Figure 3:
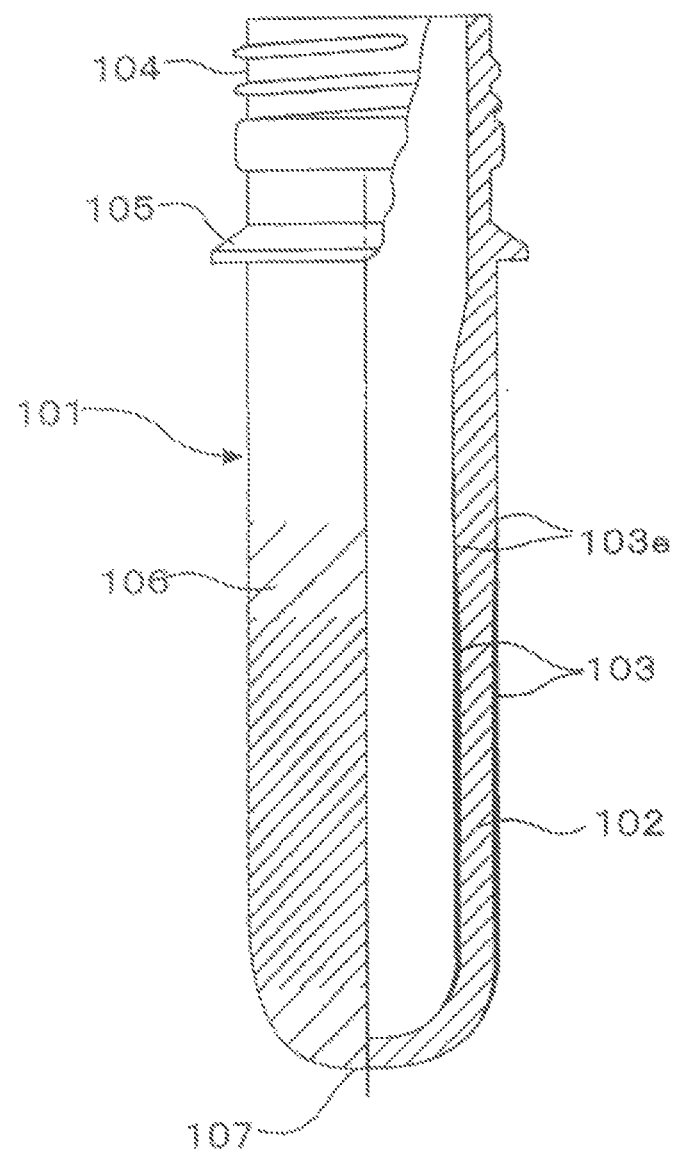
FIG. 3 is a front elevational view of the preform in the second embodiment of this invention, with the irregularly cut right half portion being shown in a vertical section.

FIG. 3 is a front elevational view of the preform 101 in the second embodiment of this invention, with about a half shown irregularly in a vertical section. The second embodiment is similar to the first embodiment in its basic structure, but the preform 101 is injected in the order of a main resin, a colored resin, and again the main resin. By setting the injection rates of the first main resin and the colored resin, it is possible to set the positions of both the upper and lower end portions of the colored resin layer 103, and especially the position of the thin boundary area 103e that is the upper end portion of the colored resin layer 103 on the body 106.

In this second embodiment, the colored resin layers 103 are formed on both the outer and inner peripheral wall surfaces of the body 106. The colored resin layer 103 on the outer surface is not covered by the main resin layer 102, but is laid in the exposed state. As a result, even if the same colored resin is used, the second embodiment gives stronger expression of color than the first embodiment does.

Figure 4:
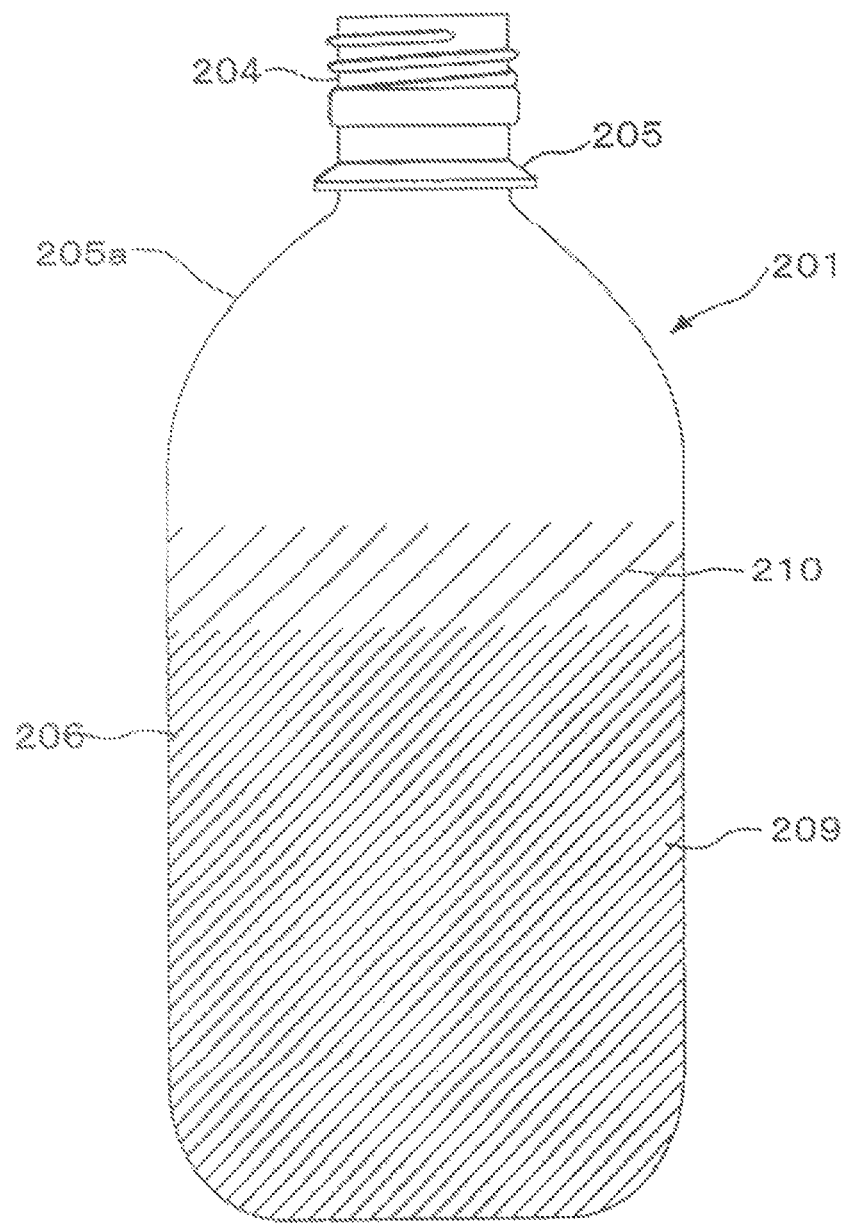
FIG. 4 is an overall view of the bottle in the second embodiment of this invention, which is obtained by biaxially drawing and blow molding the preform of FIG. 3.

FIG. 4 is an overall front elevational view of the bottle 201 of this invention, made from the preform 101 shown in FIG. 3. The color-decorated portion 209 derived from the colored resin layer 103 of the preform 101 is created in the lower half of the molded body 206. A color-gradated portion 210 is formed at the upper end of the color-decorated portion 209 to show the decorative effect of color gradation in that area where the color density gradually becomes light in the upward direction.

Figure 5:
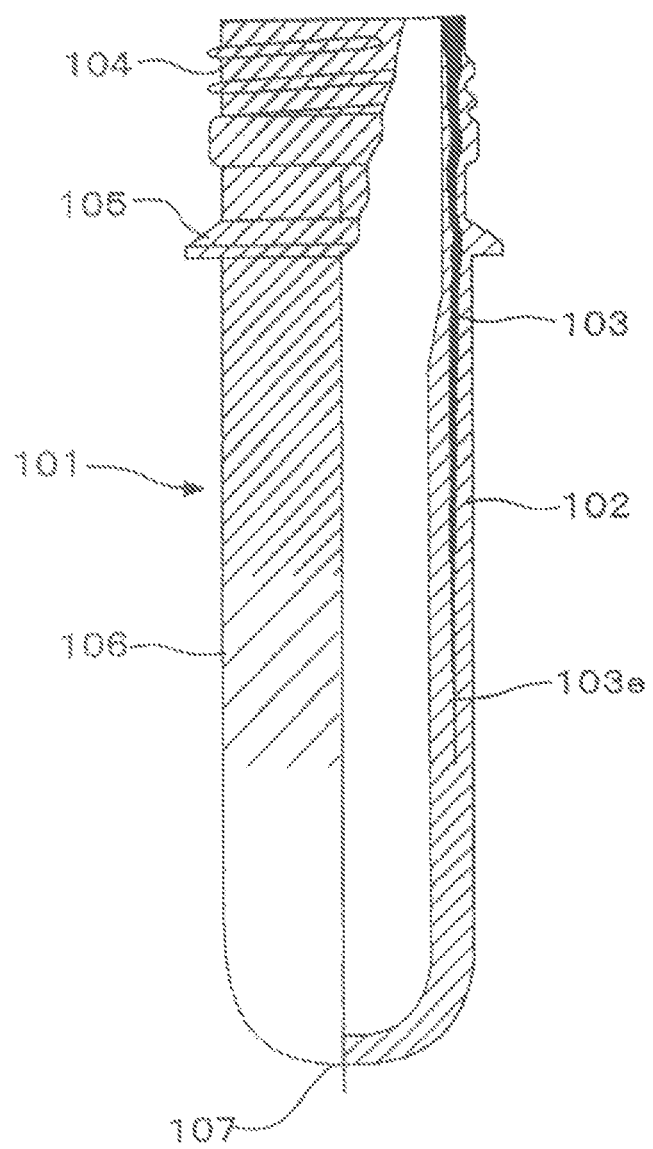
FIG. 5 is a front elevational view of the preform in the third embodiment of this invention with the irregularly cut right half portion shown in a vertical section.

FIG. 5 is a front elevational view of the preform 101 in the third embodiment of this invention. The colored resin layer 103 extends from the upper end face of the neck 104, i.e., the upper end of the preform 101, to the central portion of the body 106 where there is the thin boundary area 103e in the lower end portion of the colored resin layer 103.

In the third embodiment of the preform 101, the thin boundary area 103e is accurately positioned on the body 106 by setting the timing of injecting the colored resin.

Figure 6:
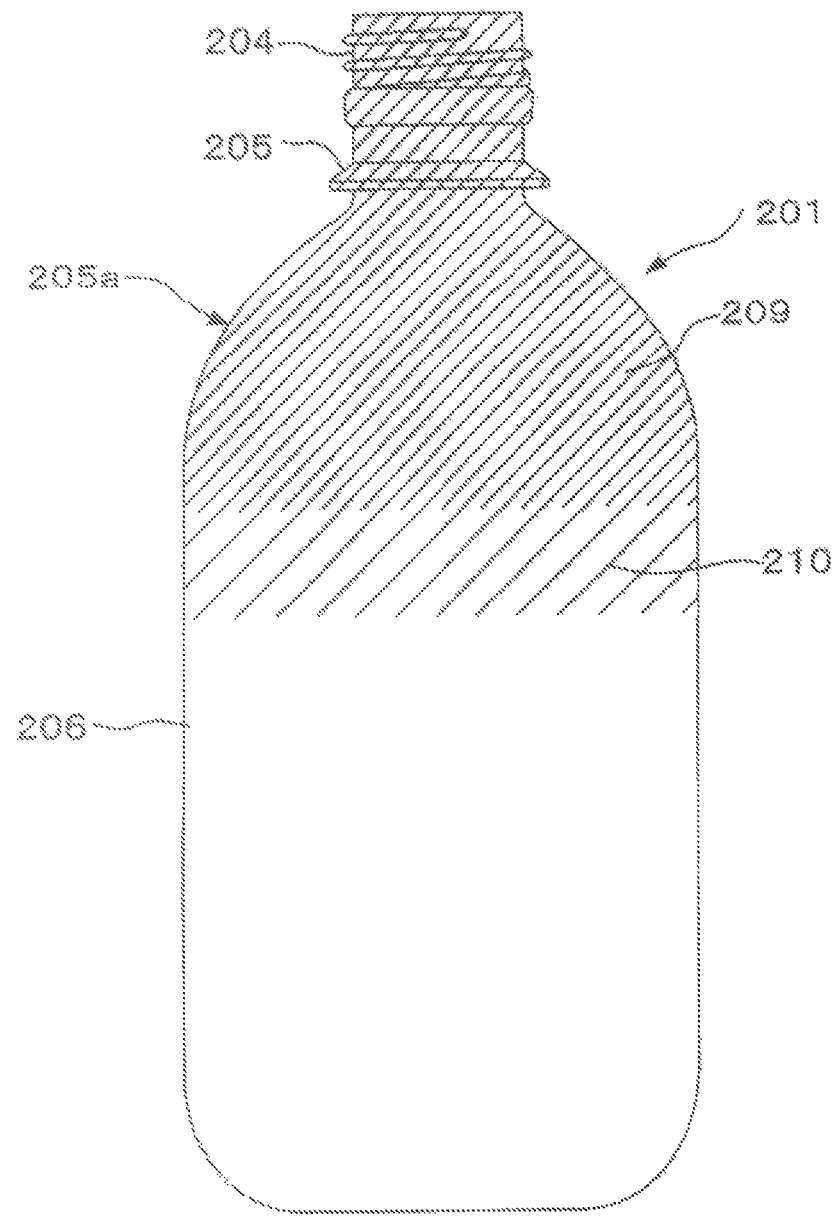
FIG. 6 is an overall view of the bottle in the third embodiment of this invention, which is obtained by biaxially drawing and blow molding the preform of FIG. 5.

FIG. 6 is an overall front elevational view of the biaxially drawn, blow-molded bottle 201 in the third embodiment, made from the preform 101 shown in FIG. 5. The color-decorated portion 209 derived from the colored resin layer 103 of the preform 101 is created in the upper half of the bottle 201 thus molded. The color-gradated portion 210 is disposed at the lower end of the color-decorated portion 209 at the center of the body 206 where the color density becomes light in the downward direction. Thus, the color-decorated portion 209 created on the bottle 201 takes the position that is upside-down from that of the bottle 201 in the embodiment shown in FIG. 4.

Reference is made to FIGS. 7 to 15 to describe the injection molding device (FIGS. 7 and 8) involved in the preform-molding process of this invention, the first example (FIGS. 9 and 10) and the second example (FIG. 13) of the injection molding pattern used with this device, the preform 101 in the fourth embodiment (FIG. 11) of this invention and the bottle 202 in the fourth embodiment (FIG. 12), the preform 101 in the fifth embodiment (FIG. 14) and the bottle 202 in the fifth embodiment (FIG. 15), all of which are molded by this injection molding pattern. The first and second examples of the injection molding pattern relate to a simultaneous molding process in which the main resin and the colored resin are injected at the same time.

Figure 7:
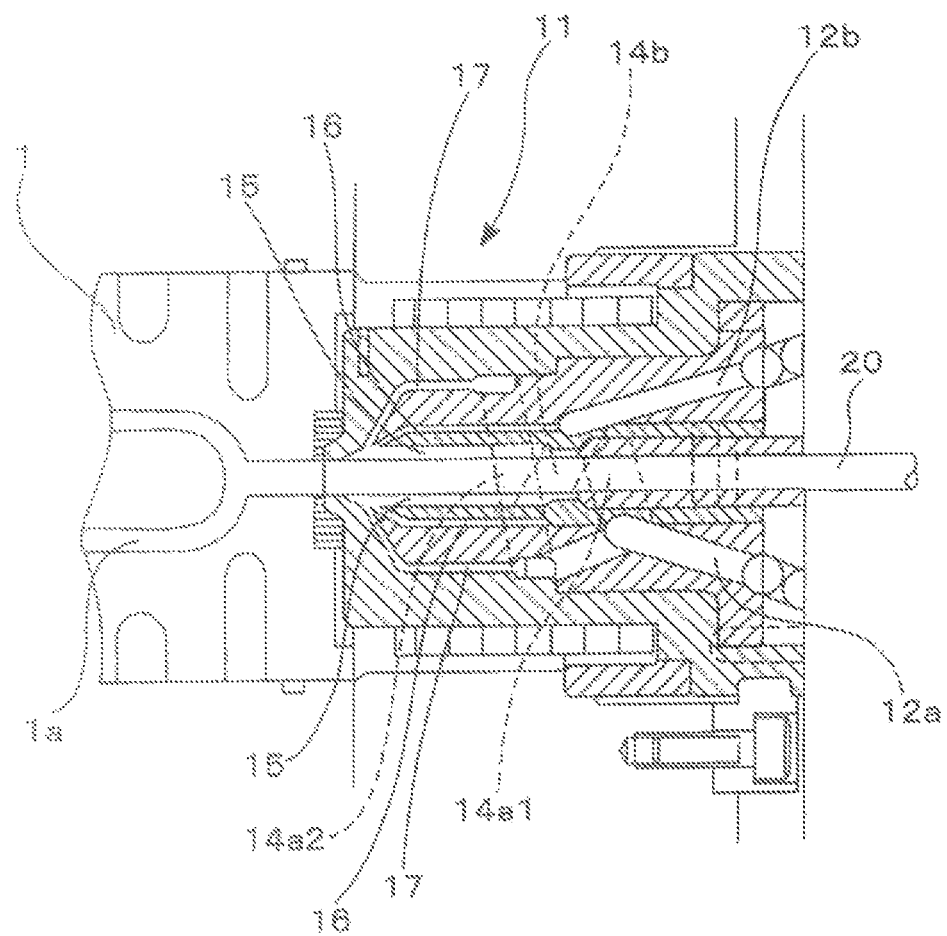
FIG. 7 is a vertical section showing an example of multiple nozzle section to be used in the molding process of this invention.
Figure 8:
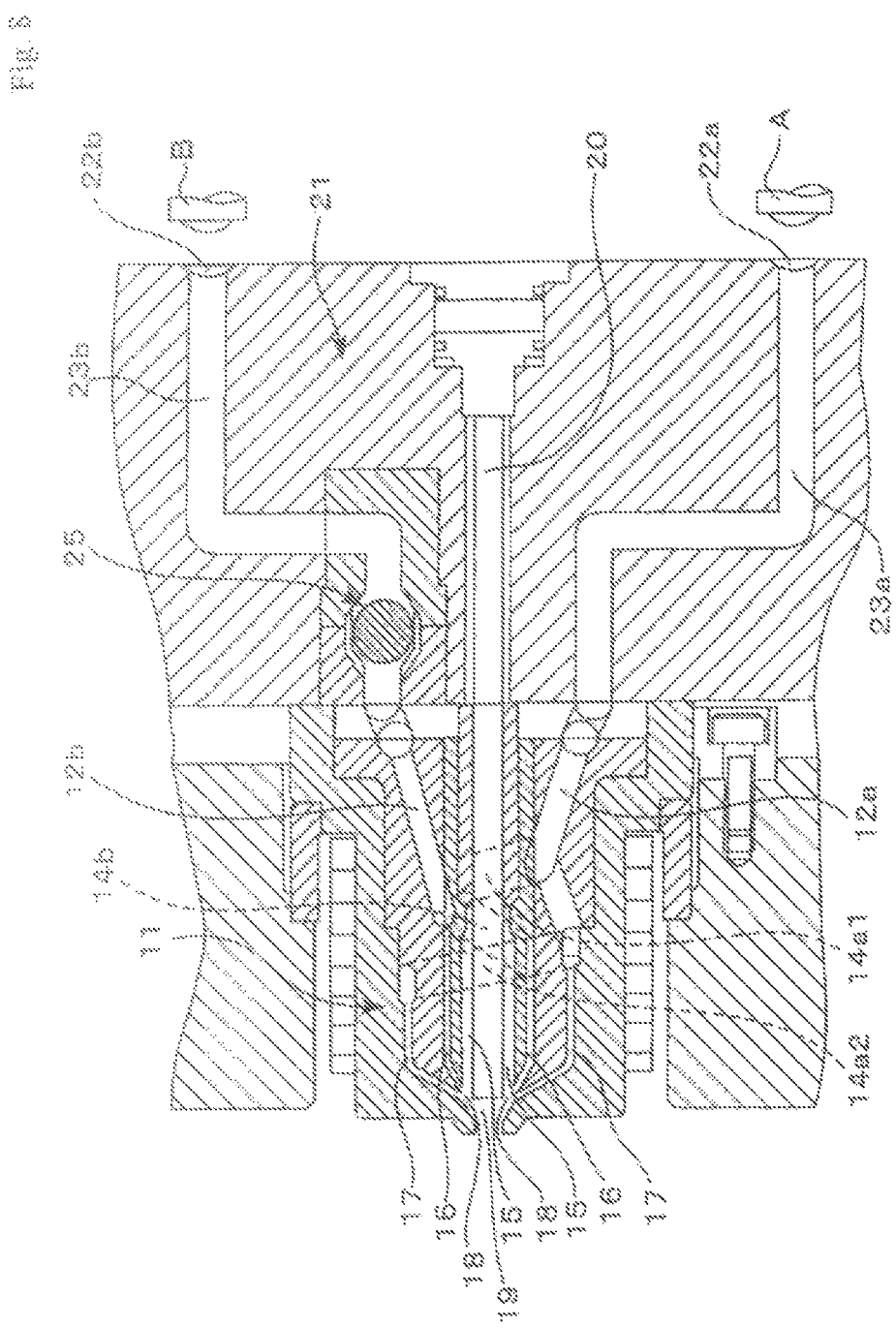
FIG. 8 is a vertical section showing the multiple nozzle section of FIG. 7 in the state in which a hot runner block has been fitted to this section.

FIGS. 7 and 8 schematically show an example of the injection molding device to be used in the preform molding process of this invention. FIG. 7 is a vertical section showing an example of multiple nozzle section 11, which shows mold 1 fitted to the downstream side of this section. FIG. 8 is a vertical section showing the multiple nozzle section 11 of FIG. 7 in the state in which a hot runner block 21 has been fitted to the upstream side of this section.

Main resin is fed into the feed port 22a from the main resin loader A and is passed through the main resin channel 23a inside the hot runner block 21. Colored resin is fed into the feed port 22b from the colored resin loader B and is passed through the colored-resin channel 23b. These resins are supplied to the multiple nozzle section 11 at a predetermined timing, are joined together in the multiple nozzle section 11, and are allowed to fill the cavity 4 of the mold 1.

Each of the above-described resin loaders A and B is provided with an extruder of the screw type or an accumulator having a plunger fitted to the head of the extruder.

A check valve 25 is disposed in the colored-resin channel 23b near the connection to the multiple nozzle section 11, and this check valve has a back-flow prevention function by the action of a ball valve. This check valve 25 can also be installed inside the multiple nozzle section 11.

Inside the multiple nozzle section 11 there are three cylindrical layer-forming channels of inner flow channel 15, middle flow channel 16, and outer flow channel 17, which are concentrically disposed from inside to outside. The main resin is passed through the main resin channel 23a and a main resin feed channel 12a connected to the main resin channel 23a, and is distributed between the inner flow channel 15 and the outer flow channel 17 through two manifolds 14a1 and 14a2, respectively. The colored resin is passed through the colored resin channel 23b and a colored resin feed channel 12b connected to the colored resin channel 23b, and is sent to the middle flow channel 16 through a manifold 14b.

At the confluence 18, the colored resin from the middle flow channel 16 is flowed between main resin layers from the inner flow channel 15 and the outer flow channel 17. A multi-layered molten resin fluid is formed concentrically within the joined flow channel 19, with the colored resin being sandwiched as the intermediate layer between the main resin layers over a certain time span. The joined fluid is injected into cavity 4 of the mold 1 to fill the cavity.

Figure 9:
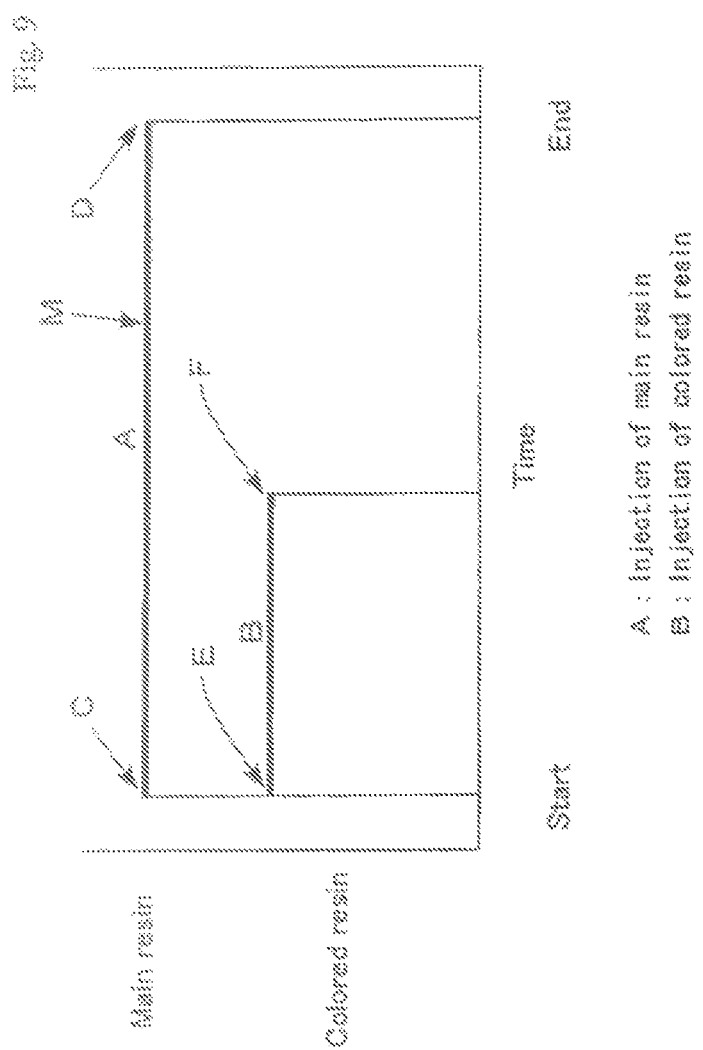
FIG. 9 is an explanatory diagram showing the first example of the injection pattern for molding the preform of this invention.

FIGS. 9-12 show in a series the preform-molding process described in FIGS. 7 and 8, the preform obtained by this process, and the bottle obtained by biaxially drawing and blow molding the preform. FIG. 9 is a schematic diagram showing the first example of the injection pattern to be used in the preform-molding process of this invention employing the molding device described above, taking time as the horizontal axis and injection pressure as the vertical axis. FIG. 10 includes schematic diagrams showing the resin flow movement in the cavity 4 caused by this injection pattern. This invention will be described below, using as an example a PET resin as the main resin and the same PET resin colored with a pigment as the colored resin.

This injection pattern is one of the so-called simultaneous injection molding patterns. The main resin is injected at a certain pressure for a predetermined time span (from point C to point D). The colored resin is injected alongside with the main resin at a certain pressure for a certain period of time (from point E to point F) within this predetermined time span. In this embodiment, the injection of both resins starts at the same time, and the injection of colored resin comes to an end on the way at point F.

FIGS. 10(a), 10(b), and 10(c) show the flow state at points F, M, and D, respectively. At point F, approximately a third of the cavity 4 has been filled, and the fluid in the laminar structure has been formed by the intermediate layer 103m of the colored resin, which is sandwiched between inner and outer layers 102 of the main resin. Since the supply of colored resin starts at point E simultaneously with the supply of the main resin which starts at point C, the downstream end 103d of the inter mediate layer 103m of the colored resin is positioned at the forefront of the fluid. (See FIG. 10(a)).

The supply of colored resin is stopped at point F, and from that point on, only the main resin is supplied. At that time, a part of the colored resin remaining near the confluence 18 of the middle flow channel 16 is pulled by the flow of the main resin coming from the inner flow channel 15 and the outer flow channel 17. As a result, the thickness of the intermediate layer 103m is reduced slowly so that the intermediate layer 103m has the shape of a gradually narrowing thread extending in the upstream direction at the upstream end 103u, as shown in FIG. 10(b). When only the main resin is further supplied, the preform thus obtained takes the shape shown in FIG. 10(c) at point D.

In the case of the device shown in FIG. 8, a check valve 25 having a back-flow prevention function by means of a ball valve is disposed between the colored resin feed channel 12b and the colored resin channel 23b (See FIG. 8). If the supply of colored resin from the resin loader B is stopped, then the ball of this check valve 25 moves in a moment and works to block the flow channel. As a result, the pressure of the colored resin inside the colored resin feed channel 12b drops in a short period of time, and the supply of colored resin to the confluence 18 comes to an end. The colored resin near the confluence 18 inside the middle flow channel 16 deforms and extends and moves to the joined flow channel 19, passing through the confluence 18. The joined resin flows into the cavity 4. As shown in FIG. 10(b), the thickness of the intermediate layer 103m is reduced at the upstream end 103u in the upward direction to assume the shape of a gradually narrowing thread.

This check valve 25 enables the colored resin to be stopped with high precision as previously determined for each shot. Thus, the colored resin can be formed into the intermediate layer 103m at a predetermined location of the preform at predetermined distribution of layer thickness. From the viewpoint of precision in each shot, the colored resin should not have a long channel from the check valve 25 to the confluence 18, but preferably should be as short as possible. If the channel were long, it would take much time for the pressure transmission, or the pressure would be deviated greatly because of a viscoelastic effect of the resin.

If a valve used does not work at once but has time lag to shut off the channel completely, as is the case with spool valve, then gradation caused by the change in thickness will show a different pattern. The injection pattern can be combined with the valve type and the switching pattern arbitrarily to form various gradation patterns for any purpose.

Figure 11:
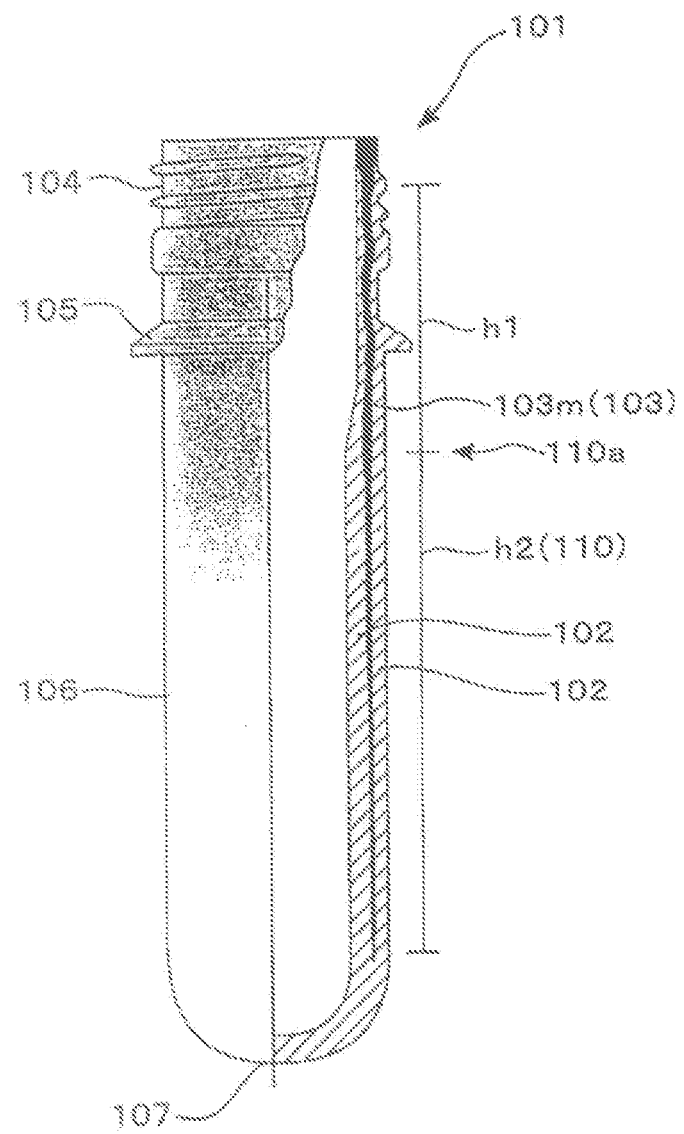
FIG. 11 is a front elevational view of the preform in the fourth embodiment of this invention, molded according to the injection pattern of FIG. 9, with a part being shown in the vertical section.

FIG. 11 is a front elevational view of the preform 101 in the fourth embodiment of this invention that has been molded by the injection pattern of FIG. 9, using the device of FIGS. 7 and 8, with a part of the preform shown in a vertical section. The intermediate layer 103m of colored resin spreads over the entire wall, due to a fountain flow effect, at the upper end of the neck 104. The intermediate layer 103m has roughly the same thickness in the height range, h1, from the neck 104 to the upper portion of the body 106. On the contrary, in the height range, h2, beneath h1, down to a level near the bottom 107, the layer thickness decreases to assume the shape of a gradually narrowing thread, thus forming a color-gradated portion 110 caused by the change in thickness of the intermediate layer 103m.

In this embodiment, the color-gradated portion 110 has the length, L, of 54 mm (with the total length of the preform 101 being 100 mm). At the base level 110a of the color-gradated portion 110, the intermediate layer 103m has the thickness, t1, of 0.9 mm. As an index for the extent of color gradation, the preform has an L/t1 of 60. This embodiment was successful in accomplishing a new type of color gradation caused by the change in layer thickness to assume the gradually narrowing thread shape.

Figure 12:
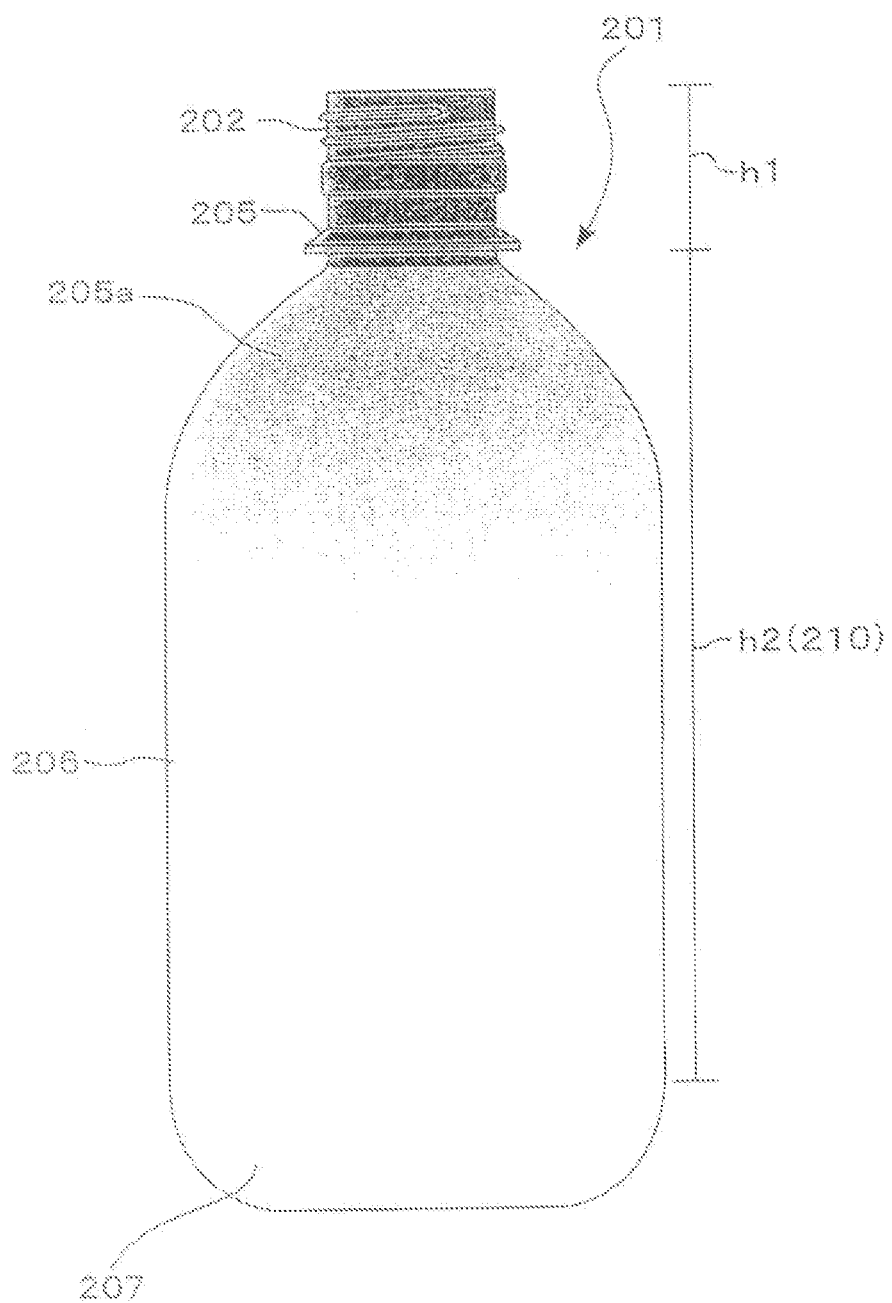
FIG. 12 is a front elevational view of the bottle in the fourth embodiment of this invention, obtained by biaxially drawing and blow molding the preform of FIG. 11.

FIG. 12 shows the bottle 201 having the cylindrical body 206, which has been biaxially drawn and blow molded from the preform 101 of FIG. 11. The bottle is deeply colored in the height range h1 from the top of the neck to the level beneath the neck ring 205. In the height range h2, below h1 where color is dark, the extent of coloration changes slowly to the colorless, transparent state to form a color-gradated portion 210. The bottom 207 and its neighborhood are a clear colorless area.

In the preform 101 of FIG. 11, the intermediate layer 103m has an almost uniform thickness in the upper portion of the body 106 in the height range h1. This portion corresponds exactly to the shoulder 205a of the bottle 201. Because the lateral draw ratio increases gradually in the downward direction in the shoulder 205a, the color-gradated portion 210 also includes this shoulder 205a of the bottle 201.

Like FIGS. 9-12, FIGS. 13-15, too, show in a series the preform-molding process described in FIGS. 7 and 8, the preform obtained by this process, and the bottle obtained by biaxially drawing and blow molding the preform.

Figure 13:
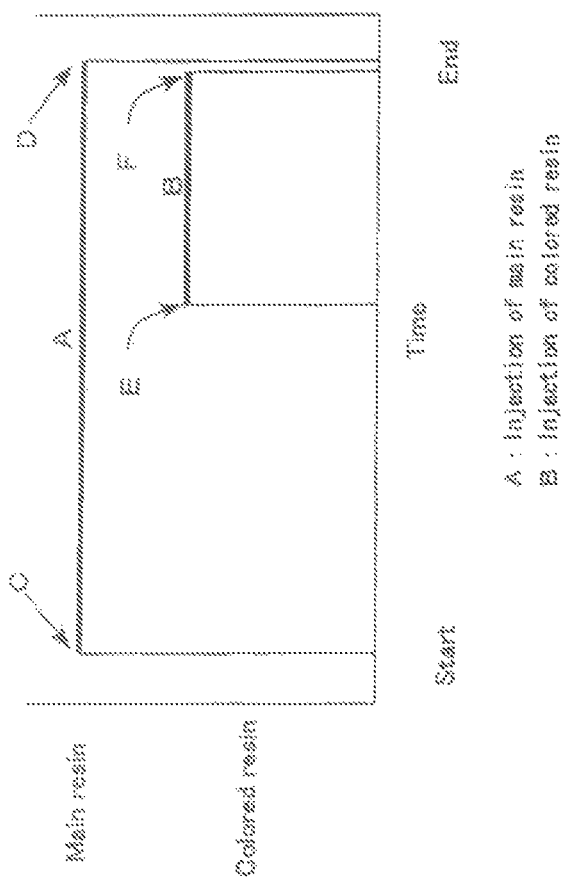
FIG. 13 is an explanatory diagram showing the second example of the injection pattern for molding the preform of this invention.

FIG. 13 is a schematic diagram showing the second example of the injection pattern to be used in the preform-molding process of this invention. This injection pattern is also one of the simultaneous injection patterns. The main resin is injected at a predetermined pressure in a specified time span (from point C to point D). The colored resin is injected alongside with the main resin at a certain pressure for a certain period of time (from point E to point F) within this time span (from point C to point D).

Figure 14:
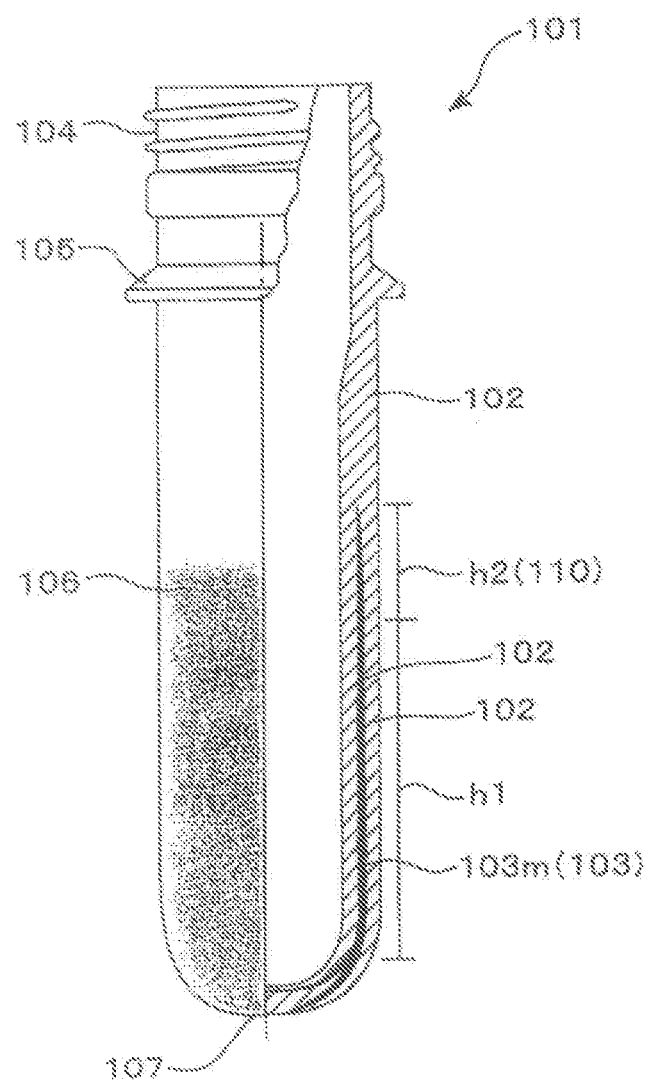
FIG. 14 is a front elevational view of the preform in the fifth embodiment, molded according to the injection pattern of FIG. 13, with a part being shown in the vertical section.

FIG. 14 is a front elevational view of the preform 101 in the fifth embodiment of this invention that has been molded by the injection pattern of FIG. 13, with a part shown in a vertical section. The intermediate layer 103m has roughly the same thickness in the height range h1, starting from the lower portion of the body 106. In the height range h2, above h1, the thickness decreases in the shape of a wedge in the upward direction, thus forming a color-gradated portion 110 caused by the change in thickness.

This color-gradated portion 110 is presumably formed in the neighborhood of the confluence at point E where the injection of colored resin begins as shown in the injection pattern of FIG. 13. At point E, the colored resin starts being brought in through the middle flow channel 16. When the colored resin flows in between the layers of main resin coming from the inner flow channel 15 and the outer flow channel 17, the forefront is found to assume the shape of a wedge.

Figure 15:
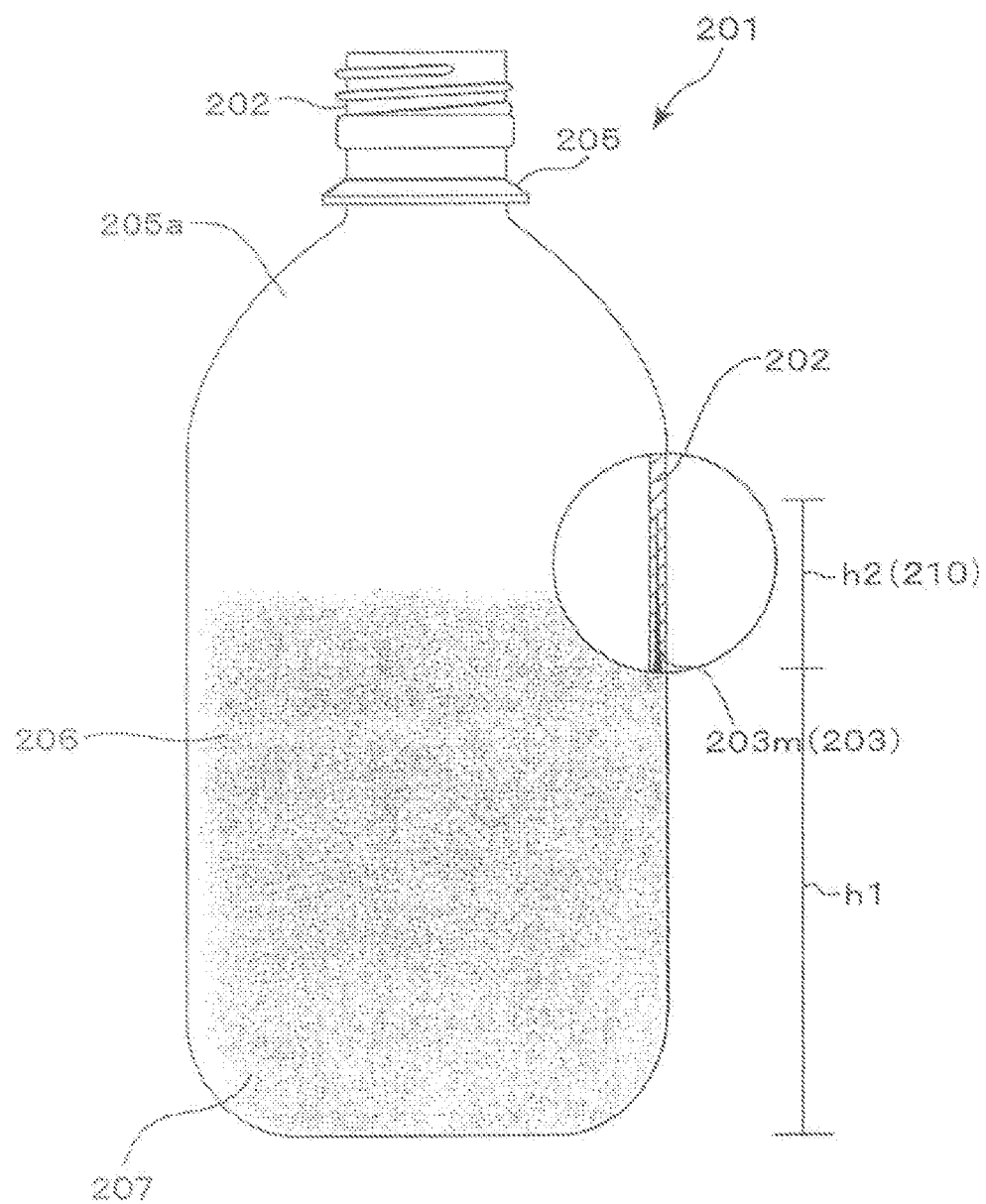
FIG. 15 is a front elevational view of the bottle in the fifth embodiment, obtained by biaxially drawing and blow molding the preform of FIG. 14.

FIG. 15 shows the bottle 201 having the cylindrical body 206 in the fifth embodiment of this invention, which has been obtained by biaxially drawing and blow molding the preform 101 of FIG. 14. In the height range h1, the body wall is colored almost uniformly. In the height range h2, the coloration gradually changes to the colorless and transparent state, and forms the color-gradated portion 210. In the area above the height range h2, the wall is colorless and clear.

The extent of color gradation of the bottle 201 in the fifth embodiment described above does not change so gradually as in the fourth embodiment. However, the change in thickness of the intermediate layer 103m in the color-gradated portion 110 of the preform 101 can be made more gentle as by giving the colored resin a lower level of viscosity than the main resin, by raising the pressure further gradually at point E of the injection pattern, or by employing a check valve that can be opened gradually.

Reference was made to FIGS. 7-15 to describe the preform-molding process related to the simultaneous injection molding, and the embodiments of the preform and the bottle. But it is to be understood by those skilled in the art that this invention is not limited to these embodiments. The synthetic resin to be used in this invention is not limited to the PET resin, but it is also possible to utilize the PP resin and the like, which have been used in conventional biaxially drawn, blow molded bottles. The molten viscosity of the colored resin can be changed for any purpose. The resins used in this invention need not necessarily be of the same type, but other types of resins can also be used. For example, a resin having a high gas barrier property, such as a nylon resin, can be utilized as the colored resin to provide a bottle having the high gas barrier property, in addition to the sophisticated decorations caused by color gradation.

In the foregoing description of preferred embodiments shown in FIGS. 7-15, the color-gradated portion was formed at either upstream or downstream end. However, depending on the purpose, it is also possible to form the color-gradated portions at both ends. Even multiple color-gradated portions can be formed in the upward and downward directions of the bottle, by injecting colored resins intermittently more than once within the predetermined time span, in which the main resin is injected. The above-described embodiments employed a molding device provided with a multiple nozzle section that passes 2 resin groups through 3 layer-forming channels. Another middle flow channel can be added for use by an additional intermediate layer. Colored resins of different colors can be supplied to these two middle flow channels to form color-gradated portions having different colors on the upstream and downstream sides or to superimpose the colors. It should be noted here that the main resin is not limited to colorless, transparent materials, but can be colored and transparent or opaque, depending on the purpose.

The middle flow channel for the colored resin is not limited to a cylindrical shape, but the cross-section may have the shape of a thin rectangle. In this case, the bottle is decorated with the intermediate layer having vertical strips of color-gradated portion in a predetermined area of the bottle.

Now reference is made to FIGS. 16-22 to describe the third example (FIGS. 16 and 19) and the fourth example (FIG. 22) of the injection molding pattern, the preform in the sixth embodiment (FIG. 20) of this invention molded by the third example of the injection molding pattern, and the bottle 201 in the six embodiment (FIG. 21) obtained by biaxially drawing and blow molding this preform 101. The third and fourth examples of the injection molding pattern are used in the successive molding process in which the main resin and the colored resin are injected successively.

Figure 16:
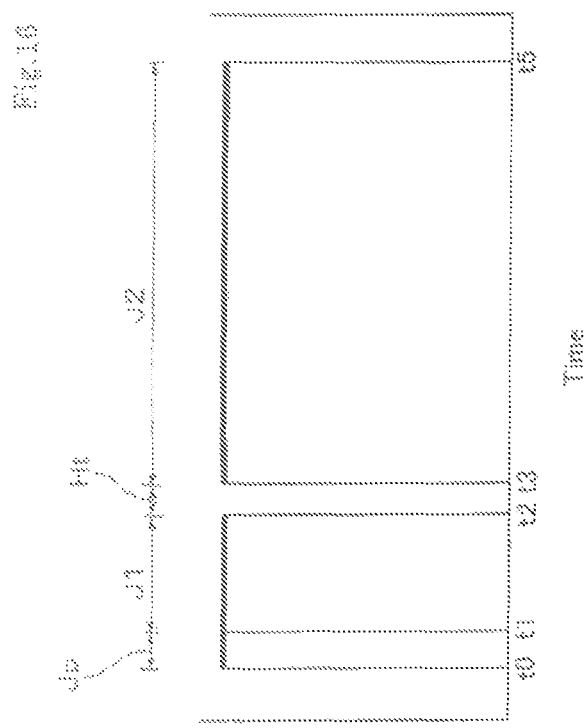
FIG. 16 is a schematic explanatory diagram showing the third example of the injection pattern for molding the perform of this invention.
Figure 17:
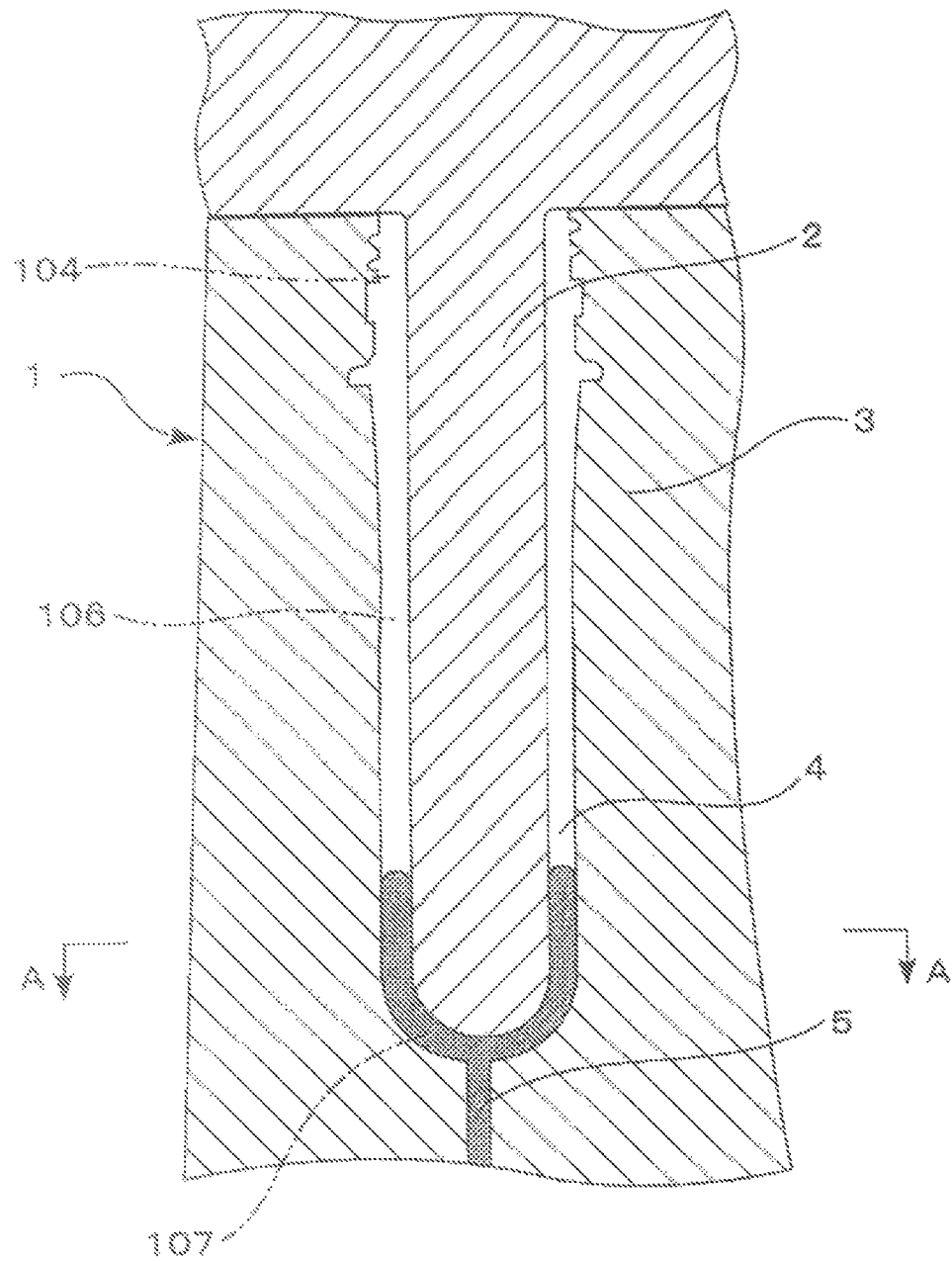
FIG. 17 is a vertically-sectional front elevational view showing an example of the mold for use in the preform molding.
Figure 18:
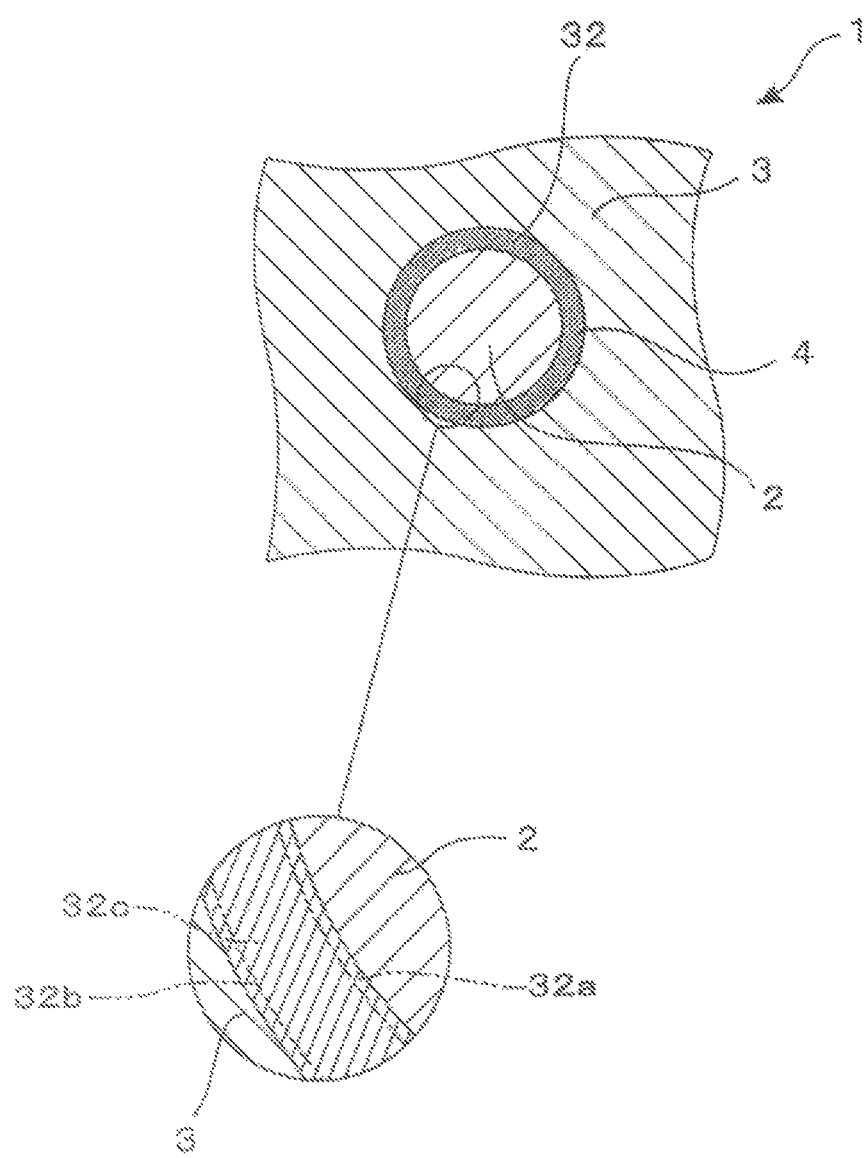
FIG. 18 is a cross-sectional plan view taken along the line A-A in FIG. 17.

FIG. 16 is a schematic explanatory diagram showing the third example of the successive injection pattern to be applied to the preform-molding process of this invention. FIGS. 17 and 18 are sectional views of the mold used in the preform-molding process of this invention.

The mold 1 shown in FIGS. 17 and 18 comprises a core mold 2 and a cavity mold 3, which are combined with each other to form a cavity 4 in the shape of a test tube. A gate 5 is disposed at the position opposed to the central part of bottom 107 of the preform 101 (See also FIG. 20). Molten resins are supplied from this gate 5, and are injected into the central part of bottom 107 (See also FIG. 16) of the preform 101 according to the injection pattern shown in FIG. 16. The injected resins move thorough the cavity 4 toward the portion corresponding to the neck 104 to fill the cavity 4.

FIG. 16 schematically shows an example of the successive injection pattern. The primary injection J1 of the colored resin 32 is given for a period ranging from t1 to t2. After a lapse of waiting time Ht ranging from t2 to t3, the secondary injection J2 of the main resin 31 is given successively for a period ranging from t3 to t5.

FIGS. 19(a), 19(b), and 19(c) are schematic diagrams showing the conditions of resins at time points t2, t4, and t5, respectively, of the above-described injection pattern. At point t2, about a fourth of the cavity 4 upward from the bottom has been filled with a short shot of colored resin 32 (See FIGS. 17, 18, and 19(a)).

Then, the supply of colored resin is brought to a halt at point t2 under the above-described filling condition. With the progress of the waiting time Ht (from t2 to t3), the short shot of the injected colored resin 32 starts to cool on the surfaces and in the vicinities of the cavity mold 3 and the core mold 2 (32a, 32b) (See an enlarged view in FIG. 8), and the cooling/solidification of the resin or an increase in the molten viscosity goes on in these parts.

The secondary injection J2 of the main resin 31 is successively given under this cooled condition. As schematically shown in FIG. 19(b), the main resin 31 in the molten state is passed through the gate 5 located at the position opposed to the center of the bottom 107 of the preform 101 and through the high-temperature portion of the colored resin 32 in the central part 32c of the cavity 4 (See the enlarged view of the cavity in FIG. 18). Then, the main resin 31 breaks through the forefront 33 of the colored resin 32, and goes on to move toward the portion corresponding to the upper part of the neck 104 (See outline arrows in FIG. 19(b)), while deforming and dragging a part of the colored resin 32 together. The main resin 31 further flows in and goes into the state shown in FIG. 19(c) at point t5.

At that time, the colored resin 32 located quite near the mold surfaces hardly flows, but remains at the position of primary injection J1. On the other hand, the colored resin 32 located at the center 32c deforms and flows as it is dragged in the flow direction. In this example, the main resin 31 breaks through the forefront 33 of the colored resin 32, as shown in FIG. 19(b), but the forefront 33 need not be necessarily broken through. Depending on the purpose of decoration, the main resin 31 can be flowed without breaking through the forefront 33.

Figure 20:
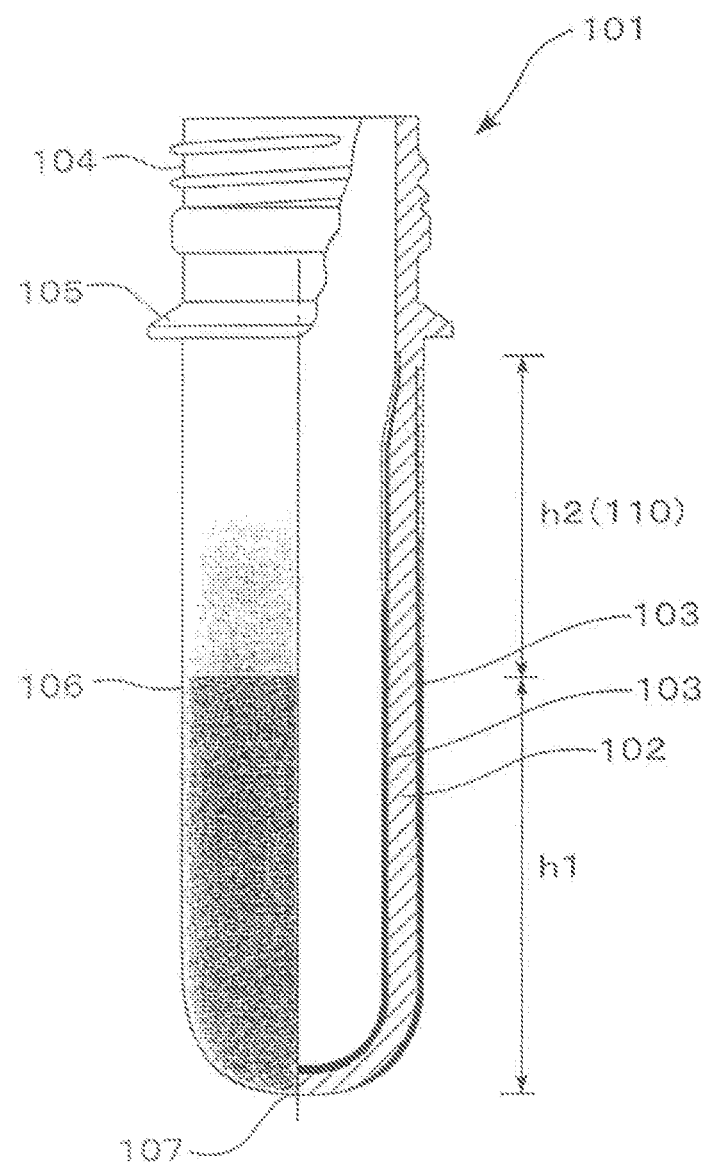
FIG. 20 is a front elevational view of the preform in the sixth embodiment of this invention, molded by the injection pattern of FIG. 16, with a part shown in a vertical section.

FIG. 20 is a front elevational view, with partly a vertical section, of the preform 101 in the sixth embodiment, molded by the above-described successive injection molding process, using the main resin 31 made of a PET resin and the colored resin 32 made of the same PET resin except that it is colored. This preform 101 has colored layers 103 in the shape of double cylinders in the inner- and outer-surface vicinities. The colored layers have an almost constant thickness in the height range h1 corresponding roughly to the lower half of the preform 101. In the height range h2, the thickness changes to assume the shape of a gradually narrowing thread, thus creating color-gradated portions 110 caused by reducing the thickness gradually in the upward direction.

Figure 21:
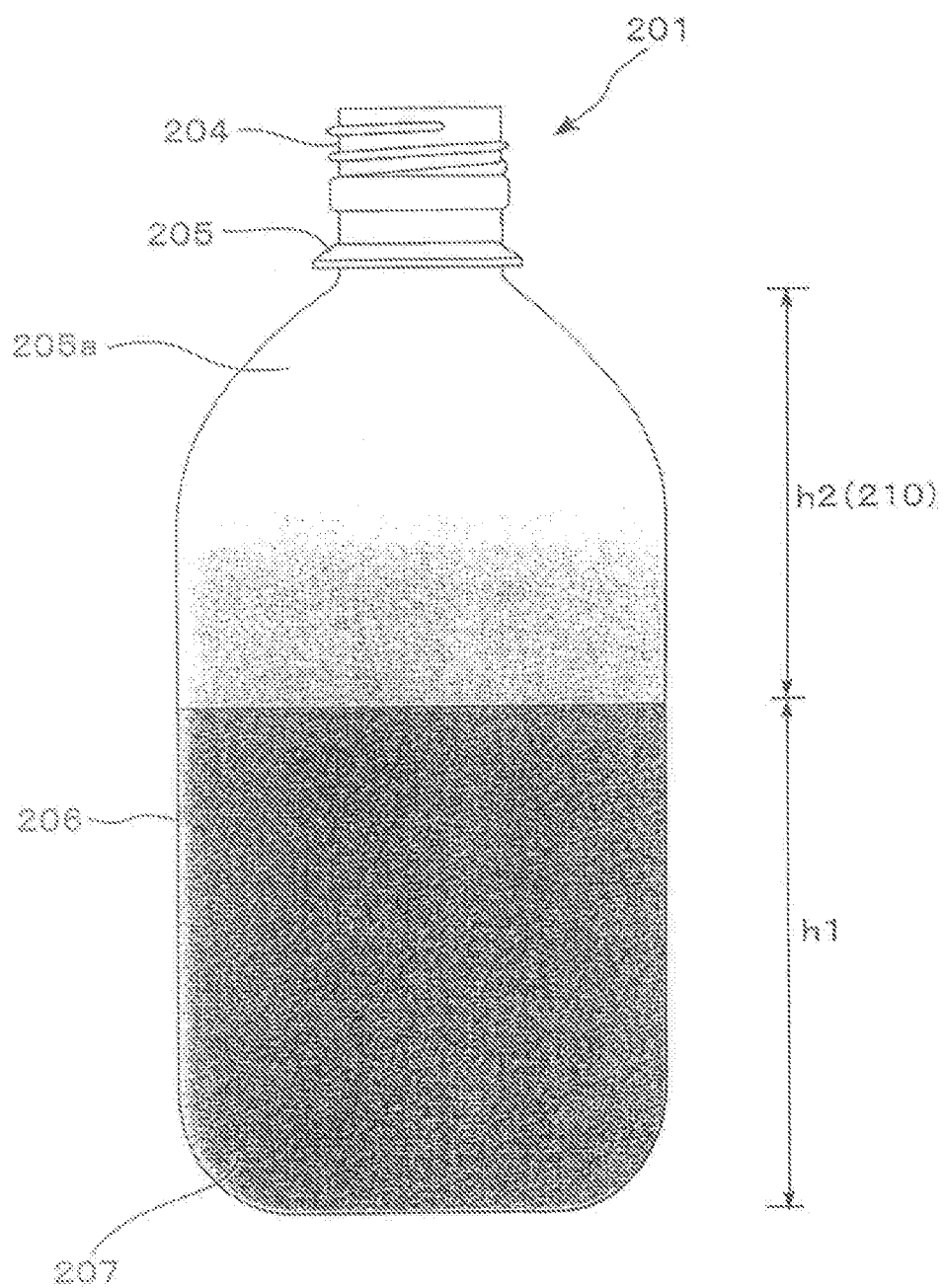
FIG. 21 is a front elevational view of the bottle in the sixth embodiment, obtained by biaxially drawing and blow molding the preform of FIG. 20.

FIG. 21 shows a bottle 201 having cylindrical body 206 in the sixth embodiment of this invention, which is obtained by biaxially drawing and blow molding the preform 101 of FIG. 20. The bottle is deeply colored in almost the same color density in the height range h1 from the bottom 207 to roughly half the body height. In the height range h2, above h1, up to the level directly beneath the neck ring 205, there appears a color-gradated portion 210 caused by the change in color density, where the extent of coloration changes slowly to the colorless, transparent state. The uppermost area including the neck 204 is a clear colorless area.

This invention has been described with respect to the preform-molding process involving the successive injection molding, and the preferred embodiments of the preform and the bottle while referring to FIGS. 16-22. but it is to be understood by those skilled in the art that this invention is not limited to these embodiments. The synthetic resin to be used in this invention is not limited to the PET resin, but it is also possible to utilize the PP resin and the like, which have been used in conventional biaxially drawn, blow molded bottles. The molten viscosity of the colored resin can be changed for any purpose. The colored resin used in this invention need not necessarily be of the same type, but other types of resins can also be used. The main resin need not be colorless and transparent, but can be colored, and transparent, translucent, or opaque.

Figure 22:
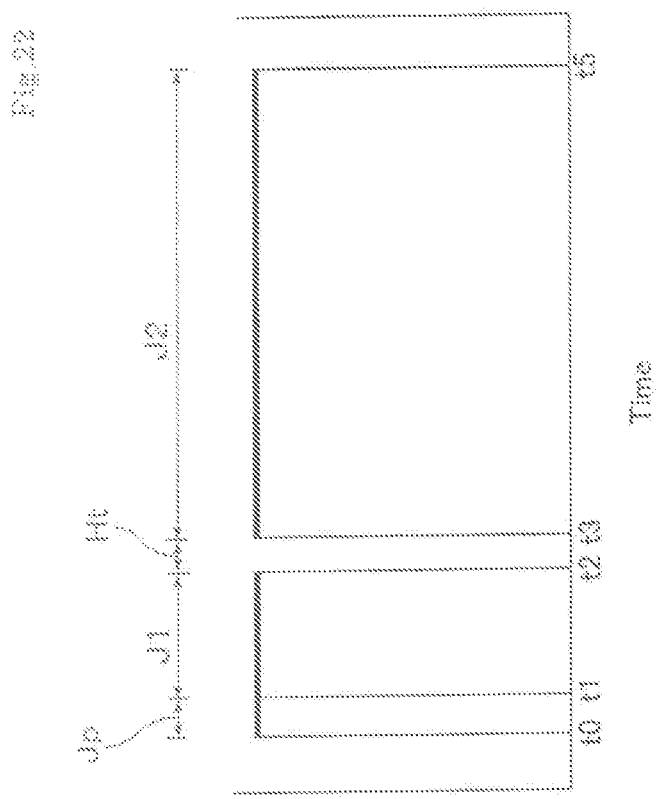
FIG. 22 is a schematic diagram showing the fourth example of the injection pattern for molding the perform of this invention.

In addition to the injection pattern described in FIG. 16 and used in the successive injection molding, other injection patterns can be utilized for any purpose. FIG. 22 shows the fourth example of the injection pattern that can be applied to this invention. In this pattern, a preliminary injection Jp of the main resin 31 is given in a predetermined amount before the primary injection J1. This preliminary injection Jp of the main resin makes it possible to raise the lower end position of each colored resin layer 103 in response to the injected amount of the main resin and to change the position of colored resin layers 103, depending on the purpose of decoration for the bottle 201, without limiting the lower end to the level shown in the embodiment of FIG. 20 where the lower end is set at the bottom 107.

Furthermore, at the time of primary injection J1 of colored resin after the preliminary injection Jp, the colored resin is forced to pass through the central part of a short shot of the main resin that has been injected preliminarily, while dragging this main resin over the mold surfaces. In this manner, both the outer surface (outermost layer) and the inner surface (innermost layer) can be configured with this main resin, depending on the condition of injection. Since the contents of the bottle do not come in direct contact with the colored resin, the user feels at ease in utilizing the bottle.

Figure 23:
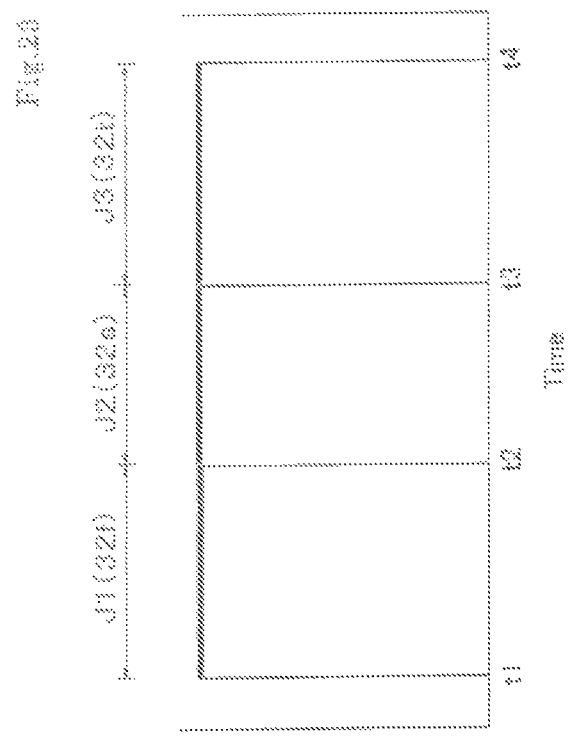
FIG. 23 is a schematic diagram showing the fifth example of the injection pattern for molding the perform of this invention.
Figure 25:
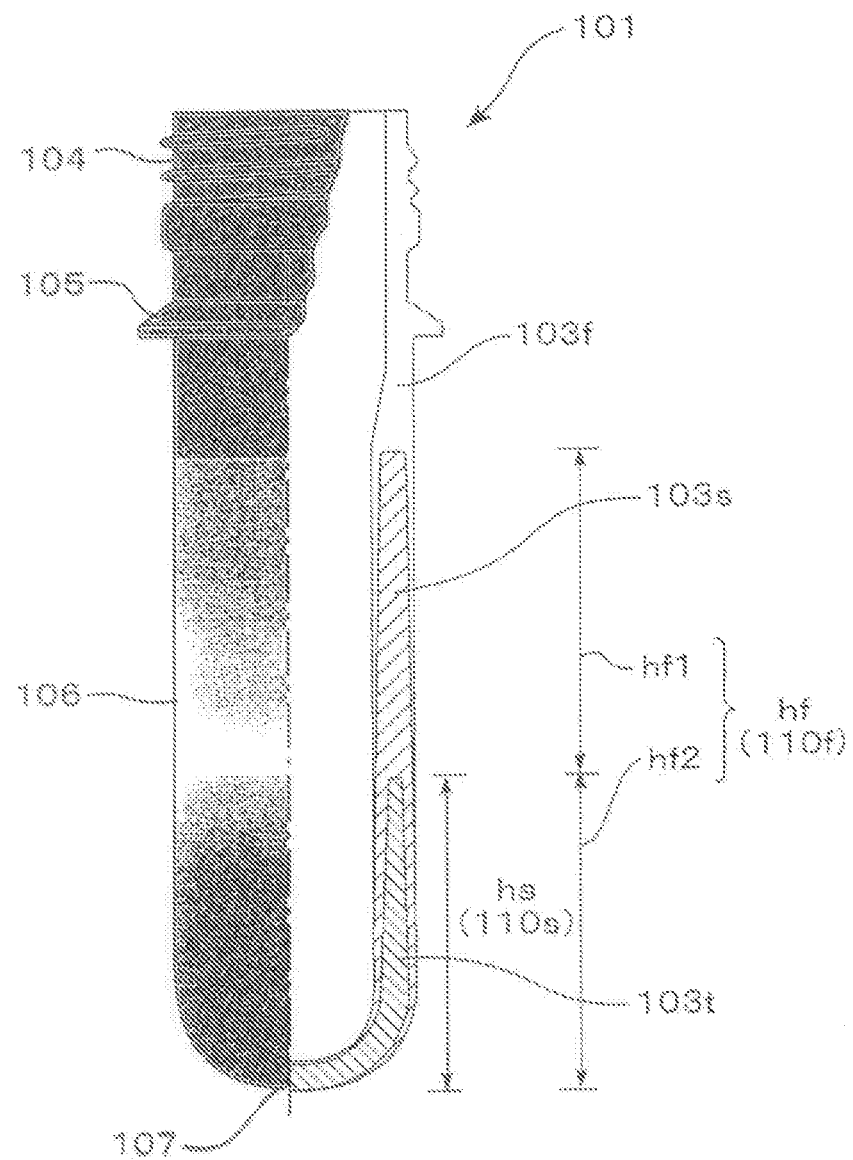
FIG. 25 is a front elevational view of the preform in the seventh embodiment of this invention, molded by the injection pattern of FIG. 23, and shown partly in vertical section.
Figure 26:
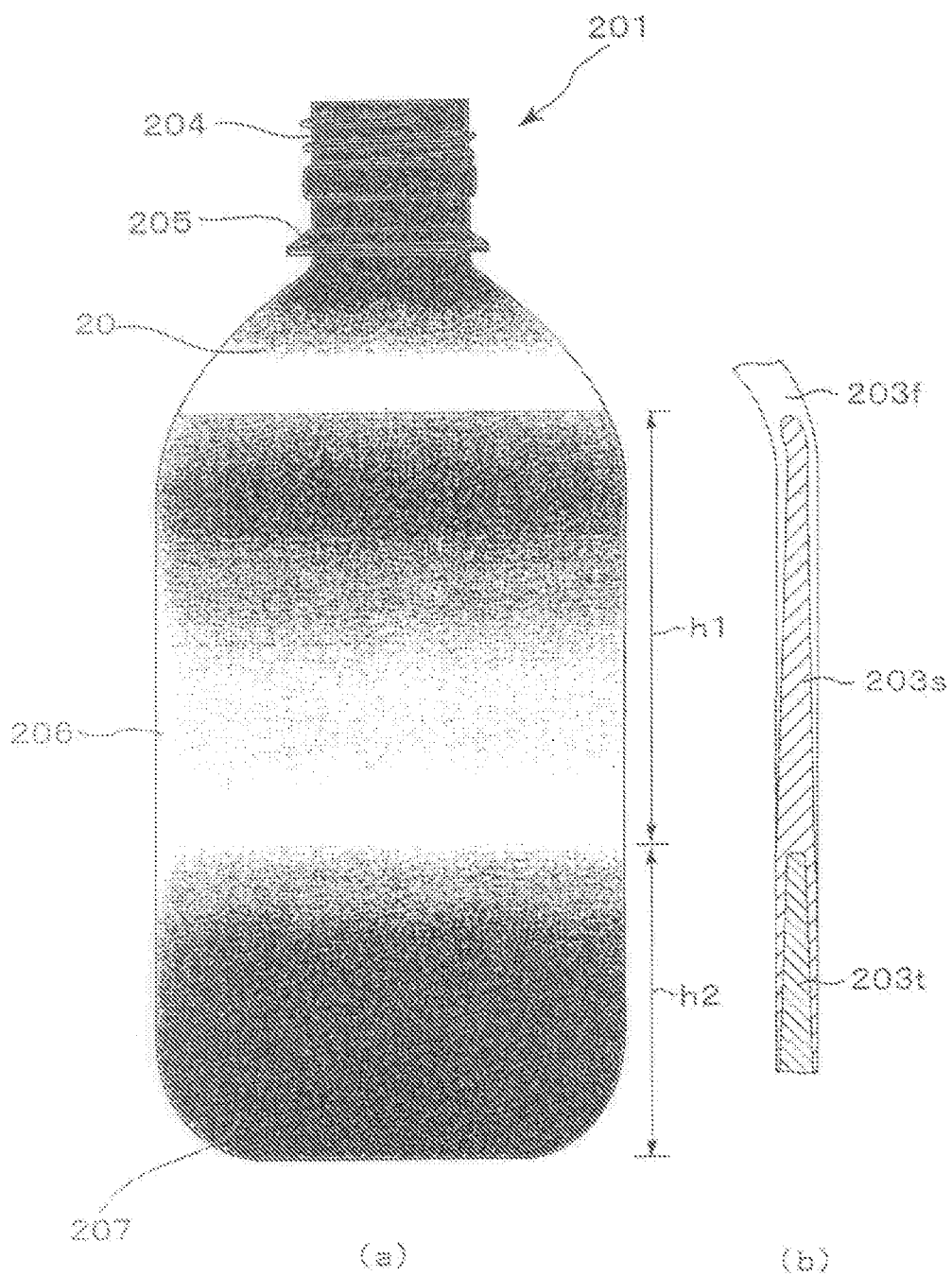
FIG. 26(*a*) is a front elevational view of a bottle in the seventh embodiment of this invention, obtained by biaxially drawing and blow molding the preform of FIG. 25.

Reference is made to FIGS. 23-25 to describe the fifth example of the injection molding pattern (FIG. 23), the preform 101 in the seventh embodiment (FIG. 25) of this invention, which is molded according to the fifth example of the injection pattern, and the bottle 201 in the seventh embodiment (FIG. 26) obtained by biaxially drawing and blow molding this preform 101. The fifth example of the injection molding pattern is based on the successive molding process in which multiple resins are successively injected.

FIG. 23 is a schematic diagram explaining the fifth example of the successive injection pattern which is applied to the preform-molding process of this invention. The preform is molded by using the mold shown in FIGS. 17 and 18.

The mold 1 shown in FIGS. 17 and 18 comprises a core mold 2 and a cavity mold 3. A cavity 4 corresponding to the preform in the shape of a test tube is formed inside the mold 1. Gate 5 is located at the position opposed to the central part of bottom 107 (See also FIG. 25.) of the preform 101. Molten resins are supplied through this gate 5 and are injected according to the injection pattern shown in FIG. 23. The first injected resin flows through the cavity 4 toward the portion corresponding to the neck 104 to fill the cavity 4.

The injection pattern schematically shown in FIG. 23 is an example of the successive injection pattern, in which colored resins 32f, 32c, and 32t are successively injected into the cavity in 3 steps of primary J1 (from time t1 to time t2), secondary J2 (from time t2 to time t3), and tertiary J3 (from time t3 to time t4).

FIGS. 24(a), 24(b), and 24(c) are schematic diagrams explaining the injection pattern at the time points of t2, t3, and t4, respectively. At point t2, a third of the cavity 4 has been filled with the colored resin 32f that was injected through the gate 5 in the state of a short shot (See FIG. 24(a)).

The primary injection J1 is brought to a halt at point t2 under the above-described filling condition, and the supply of the colored resin 32f is shut off. Then, the secondary injection J2 is subsequently started, and the colored resin 32s flows into the cavity 4 through the gate 5. The second resin 32s wedges its way through the central part of the first resin 32f, and moves through the cavity 4 toward the portion corresponding to the neck 104. At point t3 when the secondary injection J2 is brought to a halt, the two resins are in such a state as shown in FIG. 24(b).

As a result of the flow of the colored resin 32s that has been injected at the time of the secondary injection J2, the colored resin 32f from the primary injection J1 assumes the shape of double cylinders together with the colored resin 32s over the range of Wf1 shown in FIG. 24(b). In this range, the thickness of the colored resin 32f decreases gradually in the upstream direction (toward the position of the gate 5).

A tertiary injection J3 is then started subsequently, and a colored resin 32t flows into the cavity 4 through the gate 5. This time, the colored resin 32t wedges its way through the central part of the colored resin 32s and moves through the cavity 4 toward the portion corresponding to the neck 104. At point t4 when the tertiary injection J3 is brought to a halt, the three resins are in such a state as shown in FIG. 24(c)

As a result of the flow of the colored resin 32t that has been injected at the time of the tertiary injection J3, the colored resin 32s from the secondary injection J2 assumes the shape of double cylinders together with the colored resin 32t over the range of Ws shown in FIG. 24(c). In this range, the layer thickness of the colored resin 32s decreases gradually in the upstream direction. At the same time, the portion of the colored resin 32f in the double cylinders further extends over the range of Wf2.

FIG. 25 is a front elevational view, partly a vertical section, of the preform in the seventh embodiment of this invention, in which the same PET resin has been used in the primary injection J1, the secondary injection J2, and the tertiary injection J3, but in different colors: yellow, pale blue, and light red for the colored transparent resins 32f, 32s, and 32t, respectively. The preform 101 was molded by the successive molding process described above.

The preform comprises, from top to bottom, a yellow layer 103f, a pale blue layer 103s, and a light red layer 103t. In the height range hf, the colored resin layer 103f assumes the shape of double cylinders, and forms a color-gradated portion 110f caused by the change in layer thickness, which is gradually reduced toward the bottom 107. In the height range hs, the colored resin layer 103s also assumes the shape of double cylinders, and forms a color-gradated portion 110s caused by the change in layer thickness, which is gradually reduced toward the bottom 107.

FIG. 26(a) shows a bottle 2 having a cylindrical body 206 in the seventh embodiment of this invention, which was obtained by biaxially drawing and blow molding the preform 101 of FIG. 25. FIG. 26(b) is a vertical section of the body wall which has been partially enlarged in the lateral direction to explain the laminar structure of the colored resin layers 203. In the bottle 201, the laminated layers 203f, 203s, and 203t, which are colored respectively in yellow, pale blue, and light red, are the counterparts of the three colored resin layers 103f, 103s, and 103t of the preform 101 shown in FIG. 25, and are formed by biaxially drawing and blow molding the preform 101 of FIG. 25.

As a whole, the bottle 201 is transparent, but color gradations caused by the changes in color density and color shade have been created in the wall of the bottle 201. In more details, the area from the neck 204 to the shoulder 205a is yellow-colored and transparent. Gradations associated with color density appear in the shoulder 205a, with color density beginning to dilute downward because of the drawing that changes the wall thickness in the shoulder 205a. In the height range h1, the yellow-colored layer 203f and pale blue colored layer 203s overlap, and the color changes in this body portion gradually from green to pale blue in the downward direction.

The height range h2 beneath the height range h1 corresponds to the area where the height range hs of the preform 101 was drawn. In this range h2, the pale blue colored layer 203s and the light red colored layer 203t overlap, and a purple color becomes more of a red color gradually in the downward direction. Although the yellow colored layer 103f also extends to the height range h2, the layer thickness is already quite thin, and there is little effect of 103f on the color shade. If the colored resins 32s and 32t were given a higher color density, then in the height range h1, for example, there would be a larger effect of the colored resin 32s, and the gradation caused by the shades of yellow and blue would not be created vibrantly. Therefore, in this embodiment, the colored resins 32s and 32t had a pale blue color and a light red color, respectively.

This invention has been described with respect to the preform-molding process of this invention involving the successive injection molding, and the preferred embodiments of the preform and the bottle while referring to FIGS. 23-26, but it is to be understood by those skilled in the art that this invention is not limited to these embodiments.

The synthetic resins to be used are not limited to the PET resin, but those resins that are conventionally used in the biaxially drawn, blow molded bottles, such as the PP resins, can also be utilized. The molten viscosity of colored resins can be changed, depending on the purpose of use. The resins need not be of the same type, and the resins of other types can be used.

In the above-described embodiment, resins were injected successively in three steps. However, resins can also be injected in two or four steps, depending on the purpose. In the successive 3-step injections, various resins can be combined in addition to a combination of a colored transparent resin, a transparent resin of a different color, and a transparent resin of still another color. For example, combinations described below can be utilized.

(1) A colorless transparent resin/A colored transparent resin/A colorless transparent resin (2) A colored transparent resin/A colorless transparent resin/A transparent resin of the same color (3) A colored transparent resin/A colorless transparent resin/A transparent resin of a different color (4) A colored transparent resin/A transparent resin of a different color/A colorless transparent resin

INDUSTRIAL APPLICABILITY

The preform-molding process of this invention can be used to provide a bottle having new decorativeness in which highly sophisticated gradations caused by the changes in color density, color shade, or both are created by the colored resin layer or layers. This process enables the bottle products to be differentiated from other bottle products, and therefore, wide use applications are expected.

What is claimed is:

1. A synthetic resin preform in the shape of a test tube, which is molded by injecting molten resins into a mold through a multiple nozzle section and a gate disposed at a position opposed to a center of a bottom of the preform, and is used in biaxial drawing and blow molding, comprising: an intermediate layer (1) made of a colored resin, (2) formed having substantially a same thickness throughout a height range starting from a tower portion of the preform, (3) embedded in a main resin layer comprising a main resin and (4) having a thickness-related color-gradated portion caused by a change in layer thickness when a thickness of the intermediate layer is gradually reduced, the thickness having a shape of a wedge, in an upward direction at an upper end of the intermediate layer, wherein a side wall of the preform has a three layer structure, the three layer structure being a first portion of the main resin layer, followed by the intermediate layer, followed by a second portion of the main resin layer, wherein the preform is molded by a simultaneous injection molding method in which the main resin for the preform is supplied at a time span, and optionally at a pressure and/or velocity and the colored resin is supplied at a pressure and/or velocity during a time within the time span, and wherein the supplied pressure and/or velocity of the colored resin is gradually increased when the supply of the colored resin is started, so that the change in the layer thickness in the color-gradated portion is shown by a condition of $L/t1 \geq 30$ where L is a length of the color-gradated portion and t1 is the layer thickness at a base of the color-gradated portion.

2. A biaxially drawn, blow-molded synthetic resin bottle obtained from the synthetic resin preform of claim 1 and further comprising: the intermediate layer made of a colored resin and formed having substantially the same thickness throughout the height range starting from the lower portion of the preform, wherein a wall of the bottle is decorated with color gradations caused by a change in color density when the thickness of the intermediate layer is gradually reduced in the upward direction at an upper end of the intermediate layer.

3. The synthetic resin bottle according to claim 2 wherein the entire bottle is made of a polyethylene terephthalate resin and wherein color gradation has been achieved in such a way that the bottle wall changes gradually and continuously from a colorless transparent state to a colored transparent state over an area from an upper end of a shoulder to a bottom of the bottle wall.

4. A synthetic resin preform in the shape of a test tube, which is molded by injecting molten resins into a mold through a multiple nozzle section and a gate disposed at a position opposed to a center of a bottom of the preform, and is used in biaxial drawing and blow molding, comprising: an intermediate layer (1) made of a colored resin, (2) formed having substantially a same thickness throughout a height range starting from a lower portion of the preform, (3) embedded in a main resin layer comprising a main resin and (4) having a thickness-related color-gradated portion caused by a change in layer thickness when a thickness of the intermediate layer is gradually reduced, the thickness having a shape of a wedge, in an upward direction at an upper end of the intermediate layer, wherein a side wall of the preform has a three layer structure, the three layer structure being a first portion of the main resin layer, followed by the intermediate layer, followed by a second portion of the main resin layer, wherein the preform is molded by a simultaneous injection molding method in which the main resin for the preform is supplied at a time span, and optionally at a pressure and/or velocity and the colored resin is supplied at a pressure and/or velocity during a time within the time span, and wherein the colored resin has a molten viscosity that is lower than a viscosity of the main resin so that the molten resins can be deformed to assume a wedge shape at the upper end of the intermediate layer and the change in the layer thickness in the color-gradated portion is shown by a condition of $L/t1 \geq 30$ where L is a length of the color-gradated portion and t1 is the layer thickness at a base of the color-gradated portion.

5. A biaxially drawn, blow-molded synthetic resin bottle obtained from the synthetic resin preform of claim 4 and further comprising: the intermediate layer made of a colored resin and formed having substantially the same thickness throughout the height range starting from the lower portion of the preform, wherein a wall of the bottle is decorated with color gradations caused by a change in color density when the thickness of the intermediate layer is gradually reduced in an upward direction at an upper end of the intermediate layer.

6. The synthetic resin bottle according to claim 5 wherein the entire bottle is made of a polyethylene terephthalate resin and wherein color gradation has been achieved in such a way that the bottle wall changes gradually and continuously from a colorless transparent state to a colored transparent state over an area from an upper end of a shoulder to a bottom of the bottle wall.

* * * * *